US010409715B2

(12) United States Patent
Bae et al.

(10) Patent No.: US 10,409,715 B2
(45) Date of Patent: Sep. 10, 2019

(54) MEMORY CONTROLLER, NONVOLATILE MEMORY SYSTEM, AND OPERATING METHOD THEREOF

(71) Applicant: SAMSUNG ELECTRONICS CO., LTD., Suwon-si, Gyeonggi-Do (KR)

(72) Inventors: Sung-Hwan Bae, Seoul (KR); Chan-Ik Park, Suwon-si (KR); Hyun-Jin Choi, Suwon-si (KR); Seong-Jun Ahn, Seoul (KR); In-Hwan Doh, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 78 days.

(21) Appl. No.: 15/483,255

(22) Filed: Apr. 10, 2017

(65) Prior Publication Data

US 2018/0052768 A1 Feb. 22, 2018

(30) Foreign Application Priority Data

Aug. 16, 2016 (KR) .................. 10-2016-0103753

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 12/02* | (2006.01) | |
| *G06F 12/0873* | (2016.01) | |

(Continued)

(52) U.S. Cl.
CPC ...... *G06F 12/0246* (2013.01); *G06F 12/0292* (2013.01); *G06F 12/0873* (2013.01); *G06F 12/1036* (2013.01); *G06F 12/1408* (2013.01); *G06F 21/78* (2013.01); *G06F 2212/1016* (2013.01); *G06F 2212/7201* (2013.01);

(Continued)

(58) Field of Classification Search
CPC ............ G06F 12/0246; G06F 12/0292; G06F 12/0873; G06F 12/1036; G06F 2212/7201
USPC ..................................... 711/103
See application file for complete search history.

(56) References Cited

U.S. PATENT DOCUMENTS

| 9,218,279 B2 | 12/2015 | Tomlin et al. |
|---|---|---|
| 19,268,682 | 2/2016 | Tomlin et al. |

(Continued)

FOREIGN PATENT DOCUMENTS

| KR | 1020150083264 | 7/2015 |
|---|---|---|
| KR | 1020160027805 | 3/2016 |

*Primary Examiner* — Charles Rones
*Assistant Examiner* — Sidney Li
(74) *Attorney, Agent, or Firm* — F. Chau & Associates, LLC

(57) ABSTRACT

In an operating method of a memory controller, the memory controller includes a logical-to-logical (L2L) mapping table including mapping information between a first logical area and a second logical area and a logical-to-physical (L2P) mapping table including mapping information between the second logical area and a physical area of a memory device. The operating method includes receiving a first logical address of the first logical area and a first command for changing the L2L mapping table to access first data stored in the memory device through the first logical address, detecting a second logical address of the second logical area mapped to a physical address of the physical area in which the first data is stored, in response to the first command, and changing the L2L mapping table to map the first logical address to the second logical address.

17 Claims, 21 Drawing Sheets

(51) Int. Cl.
*G06F 12/1036* (2016.01)
*G06F 12/14* (2006.01)
*G06F 21/78* (2013.01)

(52) U.S. Cl.
CPC .............. *G06F 2212/7205* (2013.01); *G06F 2212/7207* (2013.01)

(56) References Cited

U.S. PATENT DOCUMENTS

| | | | |
|---|---|---|---|
| 2009/0271562 A1* | 10/2009 | Sinclair | G06F 12/0246 711/103 |
| 2011/0060887 A1* | 3/2011 | Thatcher | G06F 3/0604 711/171 |
| 2011/0238629 A1 | 9/2011 | Post et al. | |
| 2013/0073788 A1 | 3/2013 | Post et al. | |
| 2014/0082323 A1 | 3/2014 | Li | |
| 2014/0129760 A1 | 5/2014 | Lee et al. | |
| 2014/0129761 A1 | 5/2014 | Kwon | |
| 2014/0258588 A1 | 9/2014 | Tomlin et al. | |
| 2014/0281150 A1 | 9/2014 | Kuo et al. | |
| 2014/0281315 A1 | 9/2014 | Danilak et al. | |
| 2015/0046670 A1* | 2/2015 | Kim | G06F 12/0246 711/207 |
| 2015/0134621 A1* | 5/2015 | Ki | G06F 17/30115 707/689 |
| 2015/0186264 A1 | 7/2015 | Lin et al. | |
| 2015/0193339 A1 | 7/2015 | Kim et al. | |
| 2015/0347314 A1 | 12/2015 | Lee | |
| 2016/0062885 A1* | 3/2016 | Ryu | G06F 12/0246 711/103 |
| 2016/0085796 A1 | 3/2016 | Ki et al. | |
| 2016/0188410 A1* | 6/2016 | Lee | G06F 11/1044 714/6.24 |

* cited by examiner

MEMORY CONTROLLER, NONVOLATILE MEMORY SYSTEM, AND OPERATING METHOD THEREOF

CROSS-REFERENCE TO RELATED APPLICATION

This application claims priority under 35 U.S.C. § 119 to Korean Patent Application No. 10-2016-0103753, filed on Aug. 16, 2016 in the Korean Intellectual Property Office, the disclosure of which is incorporated by reference herein in its entirety.

TECHNICAL FIELD

Exemplary embodiments of the inventive concept relate to a memory controller, and more particularly, to a memory controller, a memory system including the same, and an operating method thereof, which manages a logical-to-logical (L2L) mapping table.

DISCUSSION OF RELATED ART

A storage system is configured with a host and a storage device, and the storage device may be a memory system including a memory controller and a memory device. The host and the storage device are connected to each other through various interface standards, such as universal flash storage (UFS), serial ATA (SATA), small computer system interface (SCSI), serial attached SCSI (SAS), embedded MultiMediaCard (eMMC), etc. In the storage system, data stored in one area of the storage device may be frequently copied to another area of the storage device. For example, when the storage system uses a journaling file system, journal data is stored in a journal area of the storage device, and then, is copied to an original data area. As such, overhead of the storage system may increase and lifetime of the storage system may decrease.

SUMMARY

According to an exemplary embodiment of the inventive concept, in an operating method of a memory controller, the memory controller may include a logical-to-logical (L2L) mapping table including mapping information between a first logical area and a second logical area and a logical-to-physical (L2P) mapping table including mapping information between the second logical area and a physical area of a memory device. The operating method includes receiving a first logical address of the first logical area and a first command for changing the L2L mapping table to access first data stored in the memory device through the first logical address of the first logical area, detecting a second logical address of the second logical area mapped to a physical address of the physical area in which the first data is stored, in response to the first command, and changing the L2L mapping table to map the first logical address of the first logical area to the second logical address of the second logical area.

According to an exemplary embodiment of the inventive concept, in an operating method of a memory system, the memory system may include a memory controller including a first logical area and a second logical area and a memory device including a physical area. The operating method includes receiving a first logical address of the first logical area and a first command for enabling data stored in the memory device to be accessed through the first logical address of the first logical area, and mapping a second logical address of the second logical area to the first logical address of the first logical area in response to the first command. The second logical address of the second logical area is mapped to a physical address of the physical area in which the data is stored.

According to an exemplary embodiment of the inventive concept, in an operating method of a memory controller, the memory controller may include a logical-to-logical (L2L) mapping table including mapping information between a first logical area and a second logical area and a logical-to-physical (L2P) mapping table including mapping information between the second logical area and a physical area of a memory device. The operating method includes receiving a first logical address of the first logical area and a command, determining a first L2L entry in the L2L mapping table using the first logical address of the first logical area, where the first L2L entry includes a second logical address of the second logical area, determining a first L2P entry in the L2P mapping table using the second logical address of the second logical area, where the first L2P entry includes a physical address of the physical area, and updating the L2L mapping table or the L2P mapping table in response to the command.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
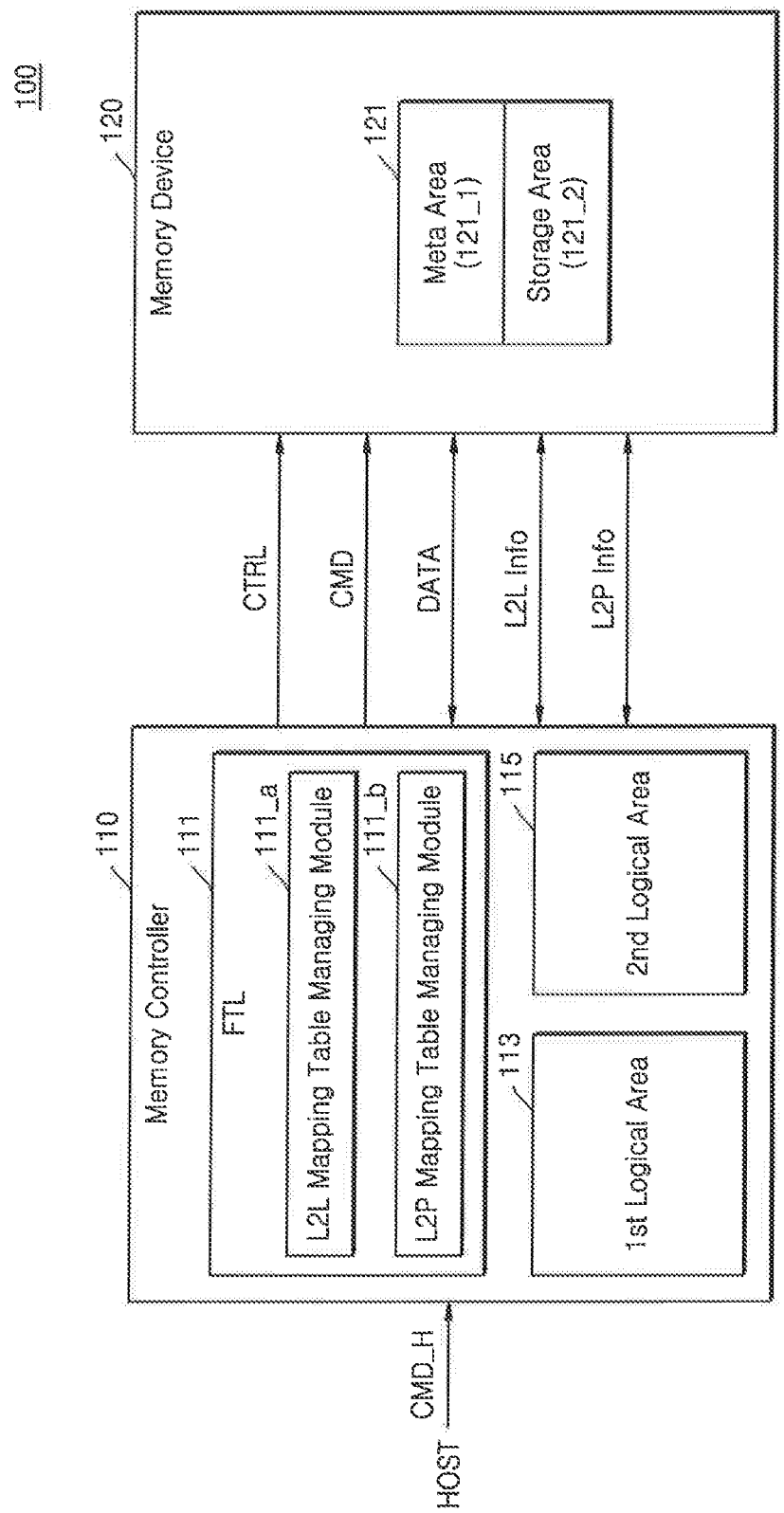
FIG. 1 is a block diagram illustrating a memory system according to an exemplary embodiment of the inventive concept.

Exemplary embodiments of the inventive concept will be described more fully hereinafter with reference to the accompanying drawings. Like reference numerals may refer to like elements through the accompanying drawings.

Exemplary embodiments of the inventive concept provide a memory controller, and more particularly, a memory controller, a memory system including the same, and an operating method thereof, which manages a logical-to-logical (L2L) mapping table.

FIG. 1 is a block diagram illustrating a memory system according to an exemplary embodiment of the inventive concept.

Referring to FIG. 1, a memory system 100 may include a memory controller 110 and a memory device 120. The memory controller 110 or the memory device 120 may be packaged and mounted using a packaging type such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), thin quad flat pack (TQFP), system in package (SIP), multi-chip package (MCP), wafer-level fabricated package (WFP), wafer-level processed stack package (WSP), or the like.

In an exemplary embodiment of the inventive concept, a host HOST may include at least one processor and a main memory. The processor may perform various computing functions such as execution of software that performs calculations or tasks. The processor may execute various application programs such as an operating system (OS) or other applications. The OS and/or other applications may be stored in the main memory or a memory device of the host HOST.

In an exemplary embodiment of the inventive concept, the memory device 120 may be a nonvolatile memory device that stores data in a non-volatile manner. For example, the memory device 120 may be a flash memory device including a plurality of flash memory cells. In an exemplary embodiment of the inventive concept, the memory device 120 may be a memory device including a plurality of resistive memory cells, such as a resistive random access memory (ReRAM), a magnetoresistive random access memory (MRAM), a phase-change random access memory (PRAM), or the like. Hereinafter, it is assumed that the memory device 120 is a flash memory device including a plurality of NAND or NOR flash memory cells.

The memory controller 110 may perform an operation of controlling the memory device 120 in response to a command CMD_H or a request from the host HOST. The command CMD_H, transferred from the host HOST to the memory controller 110, may be a command for changing a mapping table so that the host HOST may access data, stored in the memory device 120, through a new logical address. In an exemplary embodiment of the inventive concept, when the host HOST executes an application program, the command CMD_H may be a command for processing journal data when transactions, such as updating or changing a file, occur. Additionally, the command CMD_H may be a read/write command for reading or writing data from or to the memory device 120.

The memory controller 110 may supply a command CMD and a control signal CTRL to the memory device 120, in response to the command CMD_H received from the host HOST, to control a data processing operation or a data reading/writing operation on the memory device 120. Additionally, data DATA, which is to be written or read, may be transmitted or received between the memory controller 110 and the memory device 120.

In an exemplary embodiment of the inventive concept, the memory device 120 may include a physical area 121 implemented as a memory cell array, and the physical area 121 may include a meta area 121_1 storing metadata and a storage area 121_2 storing normal data, such as user data or the like. The meta area 121_1 may store various pieces of information for managing data stored in the storage area 121_2. For example, the meta area 121_1 may store L2L mapping information (L2L Info) and logical-to-physical (L2P) mapping information (L2P Info).

The memory controller 110 may include a first logical area 113 and a second logical area 115, and may manage the physical area 121 of the memory device 120, based on the first logical area 113 and the second logical area 115. With respect to the host HOST, the first logical area 113 may be an area recognized as an area for storing data, and the second logical area 115 may be an area corresponding to the first logical area 113 and the physical area 121.

In an exemplary embodiment of the inventive concept, the memory controller 110 may include a flash translation layer (FTL) 111. The FTL 111 may include an L2L mapping table managing module 111_a, an L2P mapping table managing module 111_b, and system software (or firmware) that manages a write, read, erase, and journal data processing operation of the memory device 120. The FTL 111 may be loaded into a working memory included in the memory controller 110. The firmware included in the FTL 111 may be driven by a processing unit included in the memory controller 110.

In response to a data access request from the host HOST, the FTL 111, according to an exemplary embodiment of the inventive concept, may change a logical address of the first logical area 113 to a logical address of the second logical area 115, change a logical address of the second logical area 115 to a physical address of the physical area 121, and supply the logical address of the second logical area 115 and the physical address of the physical area 121 to the memory device 120. The FTL 111 may perform a management operation on various cell areas (for example, a chip unit, a block unit, a page unit, etc.) included in the memory device 120. For example, the FTL 111 may perform a garbage collection operation, a bad block management operation, or an encryption/decryption operation based on advanced encryption standard (AES) on the memory device 120.

In response to the command CMD_H from the host HOST, the memory controller 110 may control an operation of the memory device 120, and may change L2L mapping information between the first logical area 113 and the second logical area 115 and L2P mapping information between the second logical area 115 and the physical area 121.

The L2L mapping table managing module 111_a may manage an L2L mapping table including the mapping information between the first logical area 113 and the second logical area 115. In an exemplary embodiment of the inventive concept, a write operation on the memory device 120 and an operation (for example, a journal data processing operation) of allowing data stored in the memory device 120 to be accessed through a new logical address of the first logical area 113 may be performed. In this case, the L2L mapping table managing module 111_a may change the L2L mapping table and may store the changed L2L mapping table in the meta area 121_1 of the memory device 120.

The L2P mapping table managing module 111_b may manage an L2P mapping table including the mapping information between the second logical area 115 and the physical area 121. In an exemplary embodiment of the inventive concept, when a write operation, a garbage collection operation, or the like are performed on the memory device 120, the L2P mapping table managing module 111_b may change the L2P mapping table and may store the changed L2P mapping table in the meta area 121_1 of the memory device 120.

The L2L mapping information (L2L Info) and the L2P mapping information (L2P Info) may be transmitted and received between the memory controller 110 and the memory device 120. For example, in driving the memory system 100, the L2L mapping information (L2L Info) and the L2P mapping information (L2P Info) stored in the meta area 121_1 may be supplied to the memory controller 110, and thus, the memory controller 110 may manage operations on the memory device 120 based on the L2L mapping information (L2L Info) and the L2P mapping information (L2P Info). In an exemplary embodiment of the inventive concept, the memory controller 110 may refer to the L2L mapping information (L2L Info) and the L2P mapping information (L2P Info) when controlling write, read, and erase operations on the memory device 120.

The memory controller 110, according to an exemplary embodiment of the inventive concept, may perform, on the memory device 120, the garbage collection operation or the encryption/decryption operation based on AES by using the L2P mapping information (L2P Info). In an exemplary embodiment of the inventive concept, the memory controller 110 may change the L2P mapping information (L2P Info) without changing the L2L mapping information (L2L Info) to perform the garbage collection operation. Additionally, in a case where the memory controller 110 encrypts data and writes the encrypted data in the physical area 121 of the memory device 120, the memory controller 110 may encrypt data with reference to the L2P mapping information (L2P Info), and in a case where the memory controller 110 reads the encrypted data from the physical area 121, the memory controller 110 may decrypt the encrypted data with reference to the L2P mapping information (L2P Info). Details thereof will be described below.

The memory controller 110 may execute control by using the L2L mapping information (L2L Info) so that the data stored in the memory device 120 may be accessed through a new logical address of the first logical area 113. Therefore, by skipping an undesirable copy operation of copying data stored in the memory device 120, the performance of the memory device 120 may be enhanced.

In an exemplary embodiment of the inventive concept, the memory controller 110 may perform a journal data processing operation on the memory device 120 by using the L2L mapping information (L2L Info) when a transaction occurs. In other words, the memory controller 110 may change the L2L mapping information (L2L Info) without changing the L2P mapping information (L2P Info) to perform the journal data processing operation.

A general journal data processing operation may be an operation of writing journal data, written/stored in a journal area of the physical area 121, in an original data area of the physical area 121 when a check point occurs or a dirty page of the main memory is flushed.

On the other hand, by changing the L2L mapping information (L2L Info), the memory controller 110, according to an exemplary embodiment of the inventive concept, may perform the journal data processing operation without writing the journal data in the original data area again, thus decreasing overhead of the memory controller 110 and increasing the lifetime of the memory device 120. However, the inventive concept is not limited thereto and may be applied to all normal data stored in the memory device 120.

Figure 2:
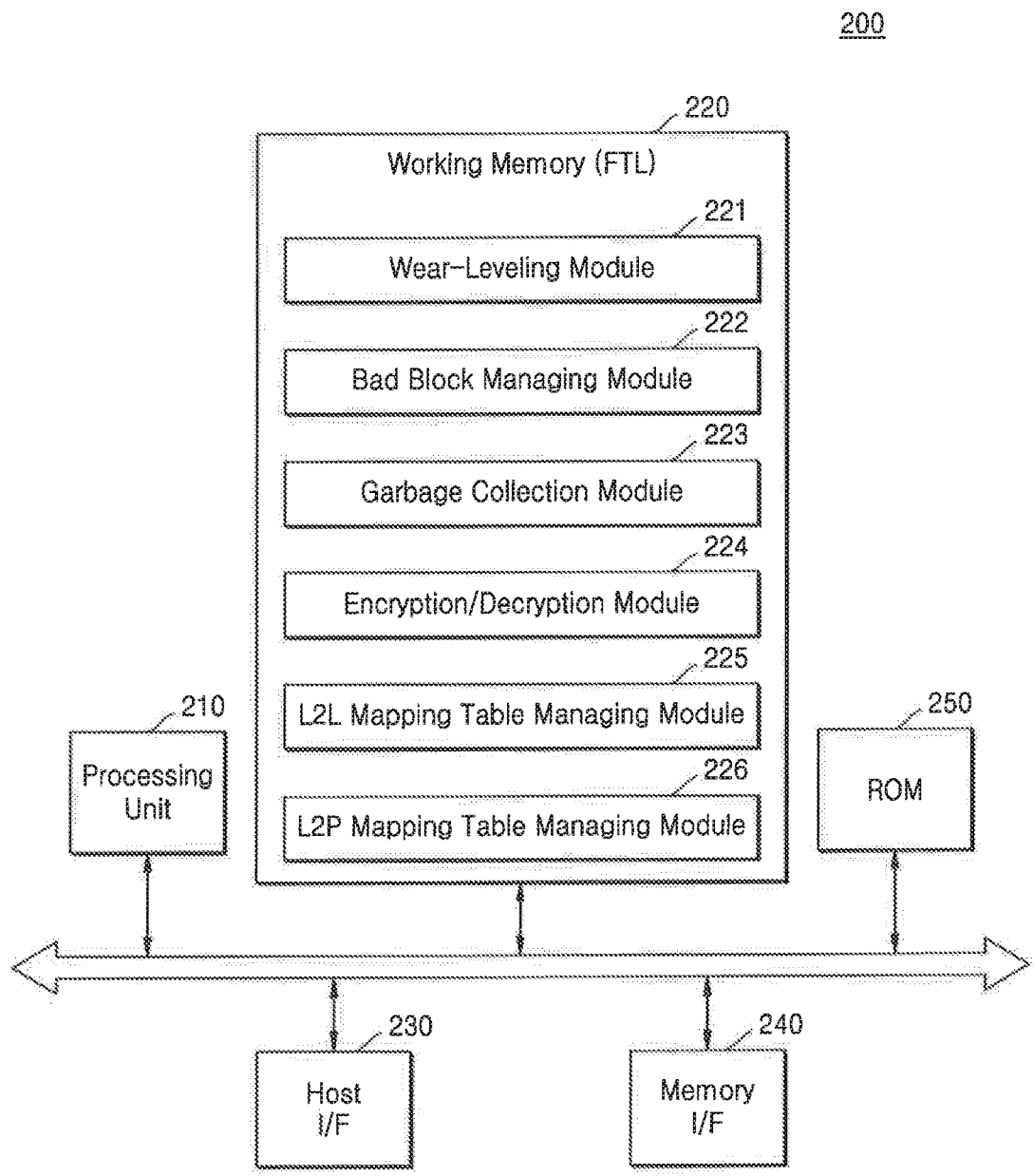
FIG. 2 is a block diagram of a memory controller according to an exemplary embodiment of the inventive concept.

FIG. 2 is a block diagram of a memory controller according to an exemplary embodiment of the inventive concept.

Referring to FIG. 2, a memory controller 200 may include a processing unit 210, a working memory 220, a host interface 230, a memory interface 240, and a read-only memory (ROM) 250. The above-described FTL 111 of FIG. 1 may be loaded into the working memory 220. The FTL 111 may include a firmware, and based on a function implemented by the firmware, the FTL 111 may include a wear-leveling module 221, a bad block managing module 222, a garbage collection module 223, an encryption/decryption module 224, an L2L mapping table managing module 225, and an L2P mapping table managing module 226.

In addition, the memory controller 200 may further include various elements, such as a buffer memory that temporarily stores data based on a read/write, a buffer control module that controls the buffer memory, a command generation module that generates the command CMD for controlling a memory operation based on a request from an external host (e.g., the host HOST), or the like.

The processing unit 210 may include a central processing unit (CPU), a microprocessor, or the like, and may control all operations of the memory controller 200. The processing unit 210 may drive the firmware loaded into the working memory 220 to control the memory controller 200. The memory controller 220 may communicate with the host HOST through various standard interfaces, and the host interface 230 may provide an interface between the host HOST and the memory controller 200. The standard interfaces may include various interfaces such as advanced technology attachment (ATA), serial-ATA (SATA), external SATA (e-SATA), small computer system interface (SCSI), serial attached SCSI (SAS), peripheral component interconnection (PCI), PCI express (PCI-E), IEEE 1394, universal serial bus (USB), secure digital (SD) card, multimedia card (MMC), embedded multi-media card (eMMC), universal flash storage (UFS), compact flash (CF) card, etc. Additionally, the host interface 230 may change a logical block address (LBA), received from the host HOST along with a certain command, to a logical address of a first logical area (e.g., the first logical area 113 of FIG. 1) of the memory controller 200. However, this is merely an example, and the host interface 230 may selectively change the LBA to the logical address of the first logical area of the memory controller 200 or a logical address of a second logical area (e.g., the second logical area 115 of FIG. 1), according to an operation mode of the memory controller 200.

The memory interface 240 may provide an interface for a memory device (e.g., the memory device 120 of FIG. 1). For example, write data and read data may be transmitted to or received from the memory device through the memory interface 240. Additionally, the memory interface 240 may supply a command and a physical address to the memory device, and moreover, may receive various pieces of information from the memory device to supply the received information to the memory controller 200.

The working memory 220 may be implemented with various memories, such as at least one of cache memory, DRAM, SRAM, PRAM, or a flash memory device. The wear-leveling module 221 may manage a wear level of each of the memory cells of the memory device. The memory cells may be aged by a write operation, an erase operation, etc., and the aged memory cells (or worn memory cells) may cause a defect. The wear-leveling module 221 may manage a program and erase cycle of a memory cell array to prevent a certain cell area from being worn before other cell areas. For example, the wear-leveling module 221 may control the L2P mapping table managing module 226 so that the number of programming and erasures may be equally assigned to cell areas of the memory cell array.

The bad block managing module 222 may manage a defective block among a plurality of blocks included in the memory device. For example, the bad block managing module 222 may control the L2P mapping table managing module 226 to prevent data from being written in a block treated as a bad or defective block.

The garbage collection module 223 may perform a garbage collection operation with reference to the L2P mapping table. For example, to secure one or more free blocks using the L2P mapping table, one or more pieces of valid data stored in a source block may be written in an arbitrary block, and a free block may be secured by erasing the source block from which pieces of the valid data have been moved.

The encryption/decryption module 224 may perform an encryption/decryption operation based on AES with reference to the L2P mapping table. As described above, the L2P mapping table may include the L2P mapping information between the second logical area 115 and the physical area 121 illustrated in FIG. 1. The L2P mapping information of the L2P mapping table may indicate a mapping relationship between a logical address of the second logical area 115 and a physical address of the physical area 121. By using the logical address of the second logical area 115 mapped to the physical address of the physical area 121 in which data is to be written, the encryption/decryption module 224 may control encryption of the data. The memory controller 200 may store the encrypted data in the physical area 121 of the memory device 120. Additionally, the encryption/decryption module 224 may control decryption of the encrypted data by using the logical address of the second logical area 115 mapped to the physical address of the physical area 121 in which the encrypted data is written. The memory controller 200 may transmit the decrypted data to the host HOST.

Referring to FIGS. 1 and 2, the L2L mapping table managing module 225 may manage the L2L mapping table including the L2L mapping information between the first logical area 113 and the second logical area 115. The L2L mapping information may indicate a mapping relationship between the logical address of the first logical area 113 and the logical address of the second logical area 115. The working memory 220 including the FTL 111 may change the logical address of the first logical area 113, received from the host HOST, to the logical address of the second logical area 115 with reference to the L2L mapping table.

The L2L mapping table managing module 225 may change the L2L mapping table in response to a command (e.g., the command CMD_H) received from the host HOST. In an exemplary embodiment of the inventive concept, the L2L mapping table managing module 225 may receive the logical address of the first logical area 113 from the host HOST, and by using the logical address of the first logical area 113, may change the L2L mapping table. In detail, the L2L mapping table managing module 225 may change the L2L mapping table so that the logical address of the first logical area 113 may be newly mapped to the logical address of the second logical area 115, which is mapped to the physical address of the physical area 121 of the memory device 120 in which data is stored. This will be described in detail below.

The L2P mapping table managing module 226 may manage the L2P mapping table including the L2P mapping information between the second logical area 115 and the physical area 121. The L2P mapping information may indicate a mapping relationship between the logical address of the second logical area 115 and the physical address of the physical area 121. The working memory 220 including the FTL 111 may change the logical address of the second logical area 115 to the physical address of the physical area 121 with reference to the L2P mapping table. The L2P mapping table managing module 226 may change the L2P mapping table for a write operation and a garbage collection operation to be performed on the memory device 120.

The L2L mapping table managing module 225 may store the changed L2L mapping table in the meta area 121_1 of the physical area 121, and the L2P mapping table managing module 226 may store the changed L2P mapping table in the meta area 121_1 of the physical area 121. In driving the memory system 100, the L2L mapping table stored in the meta area 121_1 may be loaded into the L2L mapping table managing module 225, and the L2P mapping table stored in the meta area 121_1 may be loaded into the L2P mapping table managing module 226.

The ROM 250 may store code data necessary for initial booting of a device to which the memory system is applied.

Figure 3:
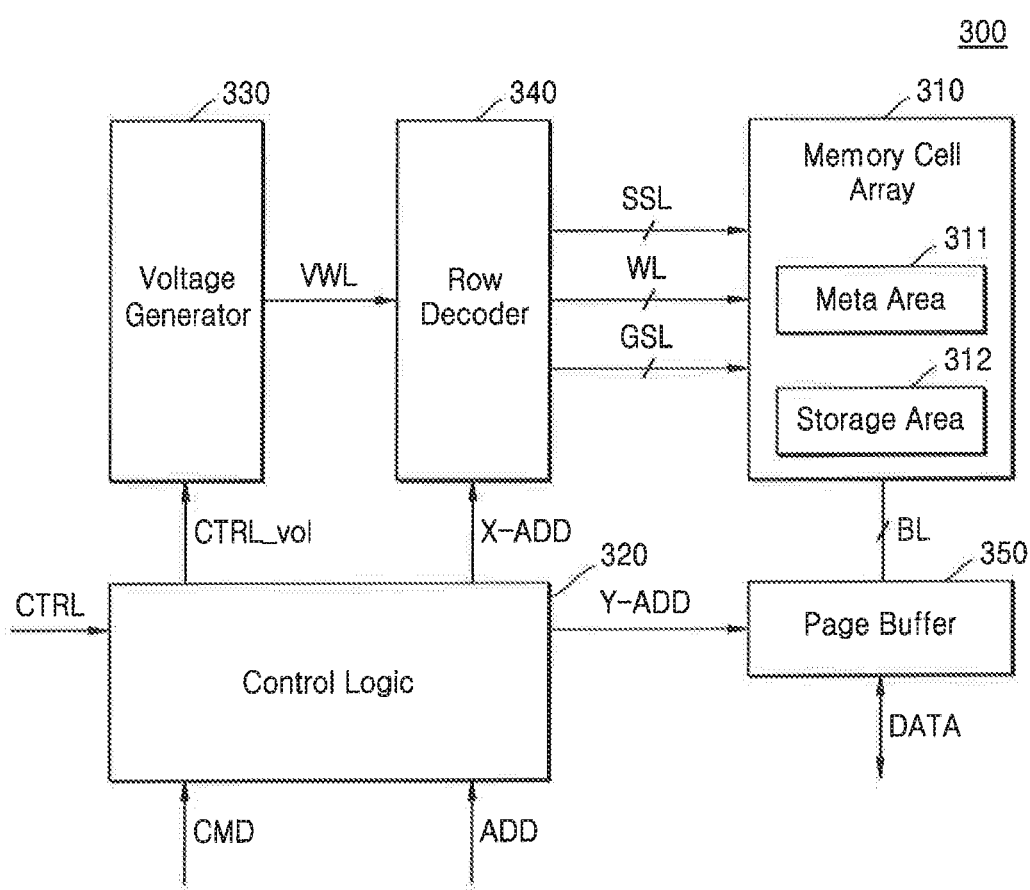
FIG. 3 is a block diagram illustrating a memory device according to an exemplary embodiment of the inventive concept.

FIG. 3 is a block diagram illustrating a memory device according to an exemplary embodiment of the inventive concept.

Referring to FIG. 3, a memory device 300 may include a memory cell array 310, a control logic 320, a voltage generator 330, a row decoder 340, and a page buffer 350. The memory device 300 may further include a data input/output circuit, an input/output interface, and/or the like.

The memory cell array 310 may include a meta area 311 storing metadata and a storage area 312 storing normal data. The meta area 311 and the storage area 312 may each include a plurality of memory cells. In a case where the memory cell array 310 includes a plurality of flash memory cells, the memory cell array 310 may be connected to a plurality of word lines WL, a string selection line SSL, a ground selection line GSL, and a plurality of bit lines BL. For example, the memory cell array 310 may be connected to the row decoder 340 through the plurality of word lines WL, the string selection line SSL, and the ground selection line GSL and may be connected to the page buffer 350 through the plurality of bit lines BL.

The control logic 320 may write data in the memory cell array 310, read data from the memory cell array 310, or output various internal control signals for erasing data stored in the memory cell array 310, based on the command CMD, an address ADD, and the control signal CTRL received from a memory controller (e.g., the memory controller 110 of FIG. 1).

The various control signals output from the control logic 320 may be supplied to the voltage generator 330, the row decoder 340, and the page buffer 350. For example, the control logic 320 may supply a voltage control signal CTRL_vol to the voltage generator 330, a row address X-ADD to the row decoder 340, and a column address Y-ADD to the page buffer 350. However, the inventive concept is not limited thereto, and the control logic 320 may further supply other control signals to the voltage generator 330, the row decoder 340, and the page buffer 350.

The voltage generator 330 may provide a word line voltage VWL to the row decoder 340.

According to an exemplary embodiment of the inventive concept, the L2L mapping table and the L2P mapping table, as described above, may be stored in the meta area 311, and in booting a memory system including the memory device 300, the L2L mapping table and the L2P mapping table stored in the meta area 311 may be supplied to the memory controller. According to an exemplary embodiment of the inventive concept, the storage area 312 may be divided into a journal area and an original data area. Journal data may be stored in the journal area, and normal data may be stored in the original data area.

Figure 4:
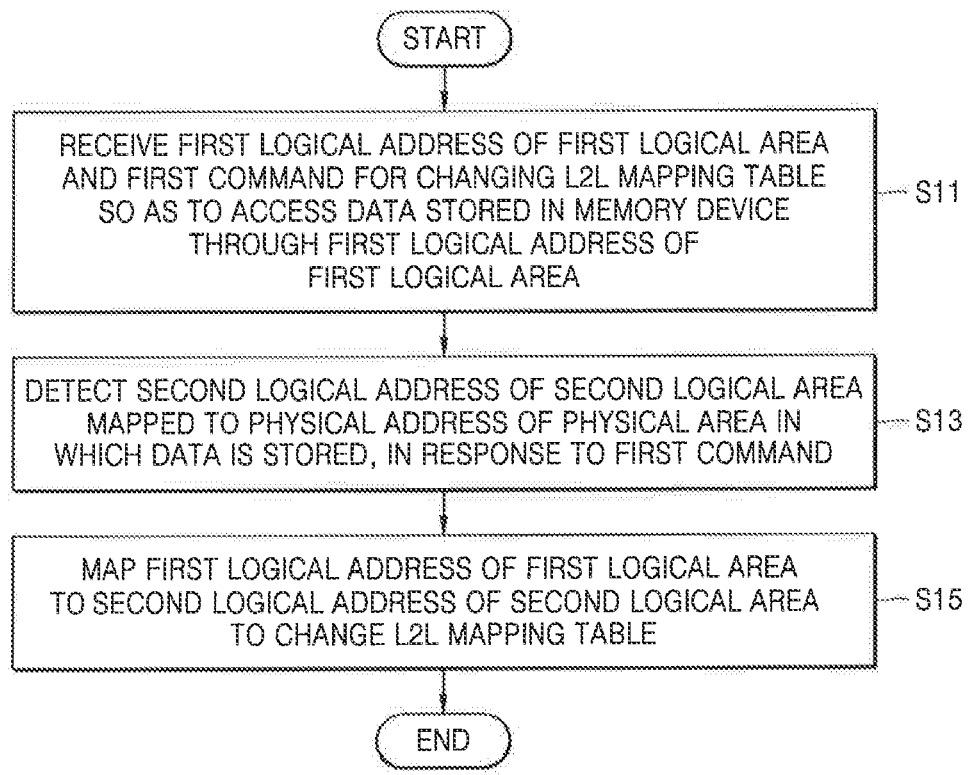
FIG. 4 is a flowchart illustrating an operation of a memory controller according to an exemplary embodiment of the inventive concept.

FIG. 4 is a flowchart illustrating an operation of a memory controller according to an exemplary embodiment of the inventive concept.

Referring to FIG. 4, in operation S11, the memory controller may receive a first logical address of a first logical area and a first command for changing an L2L mapping table so as to access data stored in a memory device through the first logical address of the first logical area. In operation S13, the memory controller may detect a second logical address of a second logical area mapped to a physical address of a physical area in which the data is stored, in response to the first command. In operation S15, the memory controller may map the first logical address of the first logical area to the second logical address of the second logical area to change the L2L mapping table. Therefore, the memory controller may access the data stored in the memory device by using the first logical address of the first logical area. Additionally, the memory controller may access the data stored in the memory device by using a third logical address of the first logical area previously and still mapped to the second logical address of the second logical area.

In an exemplary embodiment of the inventive concept, the data stored in the memory device may correspond to the journal data. Additionally, the first command according to an exemplary embodiment of the inventive concept may correspond to one of a MOVE command, a SHARE command, or a SWAT command. However, the first command is not limited thereto, and may be implemented as various commands for issuing a request, to the memory controller, to change the L2L mapping table.

Instead of performing a copy operation on the data stored in the memory device, the memory controller may change the L2L mapping table in response to the first command received from a host, thus reducing the number of writes and erasures on a memory cell array of the memory device. Accordingly, the lifetime of the memory device may be extended.

Figure 5:
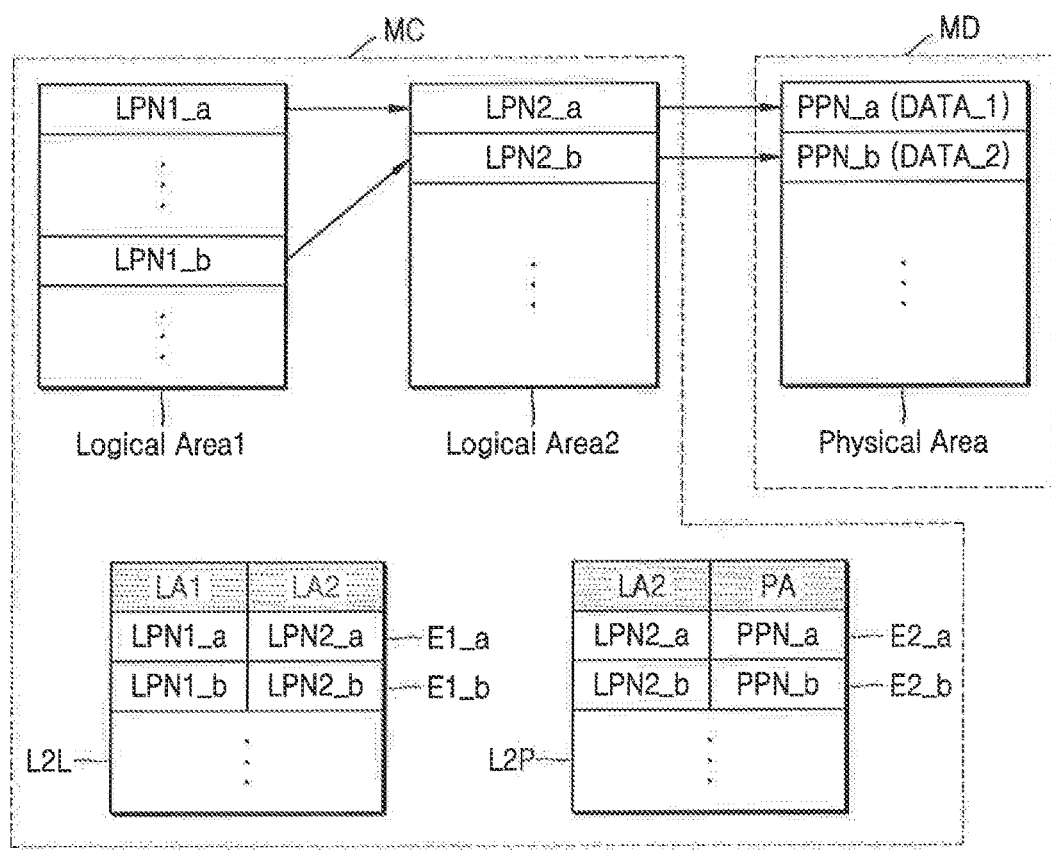
FIG. 5 is a diagram for describing an operating method of a memory system according to an exemplary embodiment of the inventive concept.

FIG. 5 is a diagram for describing an operating method of a memory system according to an exemplary embodiment of the inventive concept.

Referring to FIG. 5 a memory controller MC may include a first logical area (Logical Area 1) and a second logical area (Logical Area 2). The memory controller MC may manage a physical area (Physical Area) of a memory device MD, based on the first logical area (Logical Area 1) and the second logical area (Logical Area 2). The memory controller may change a logical address LA1 of the first logical area (Logical Area 1) to a logical address LA2 of the second logical area (Logical Area 2) with reference to an L2L mapping table L2L and may change the logical address LA2 of the second logical area (Logical Area 2) to a physical address PA of the physical area (Physical Area) with reference to an L2P mapping table L2P.

Hereinafter, a logical page number1 (LPN1) may be a logical address corresponding to an area of the first logical area (Logical Area 1), a logical page number2 (LPN2) may be a logical address corresponding to an area of the second logical area (Logical Area 2), and a physical page number (PPN) may be a physical address corresponding to an area of the physical area (Physical Area).

The L2L mapping table L2L may contain entries associated with the logical address LA2 of the second logical area (Logical Area 2) corresponding or mapped to the logical address LA1 of the first logical area (Logical Area 1), and the L2P mapping table L2P may contain entries associated with the physical address PA corresponding or mapped to the logical address LA2 of the second logical area (Logical Area 2). The L2L mapping table L2L may include a plurality of L2L entries E1_a, E1_b, etc. For example, a first L2L entry E1_a may represent a mapping relationship between LPN1_a and LPN2_a, and a second L2L entry E1_b may represent a mapping relationship between LPN1_b and LPN2_b. Additionally, the L2P mapping table L2P may include a plurality of L2P entries E2_a, E2_b, etc. For example, a first L2P entry E2_a may represent a mapping relationship between LPN2_a and PPN_a, and a second L2P entry E2_b may represent a mapping relationship between LPN2_b and PPN_b.

First data DATA_1 may be written in a physical area corresponding to PPN_a in the physical area (Physical Area), and second data DATA_2 may be written in a physical area corresponding to PPN_b in the physical area (Physical Area). The memory controller MC may access data such as first and second data DATA_1 and DATA_2 with reference to the L2L mapping table L2L and the L2P mapping table L2P. However, FIG. 5 merely illustrates an example and the inventive concept is not limited thereto.

Figure 6:
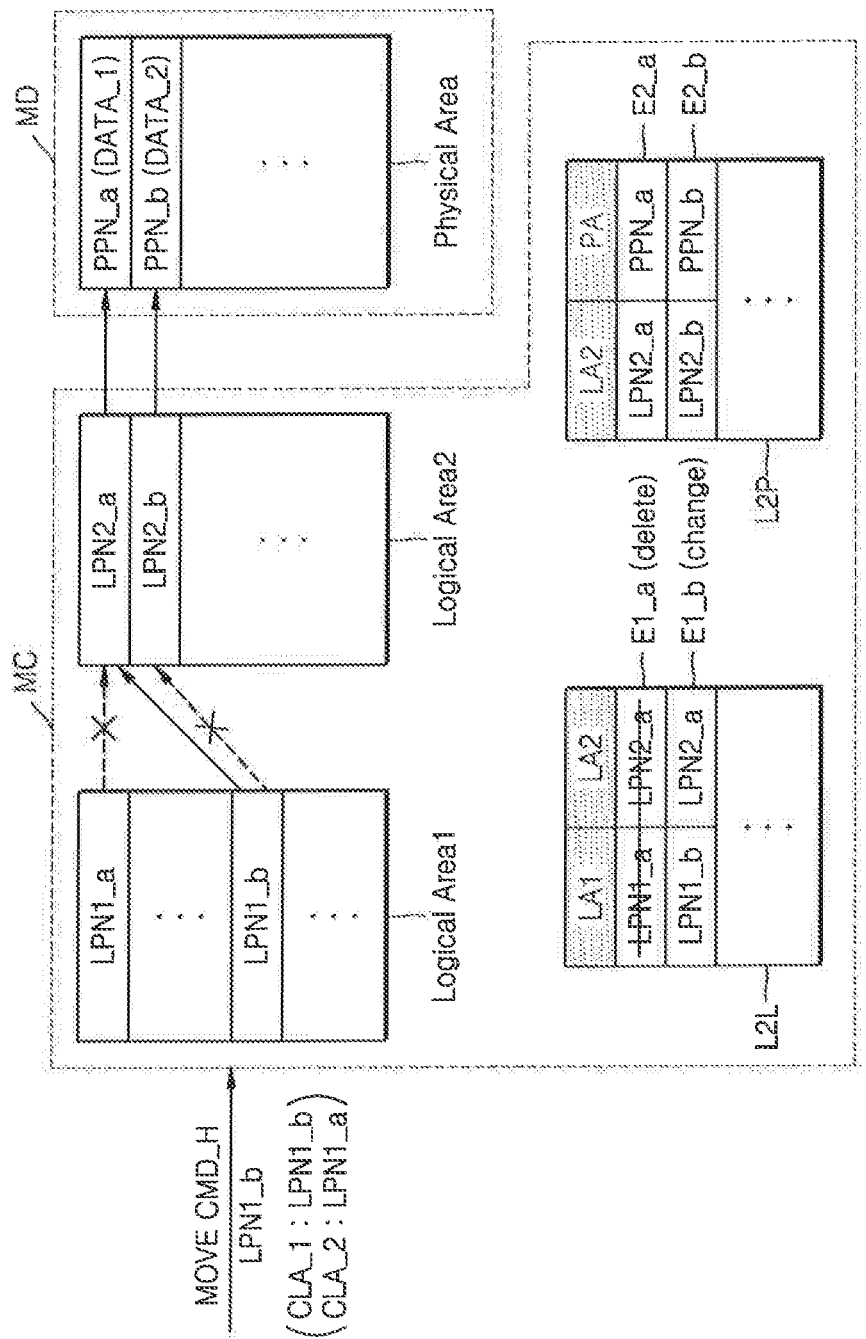
FIG. 6 is a diagram for describing an operation of a memory system based on a MOVE command according to an exemplary embodiment of the inventive concept.

FIG. 6 is a diagram for describing an operation of a memory system based on a MOVE command according to an exemplary embodiment of the inventive concept.

Referring to FIG. 6, the memory controller MC may receive, from the host, LPN1_b which is one of the logical addresses LA1 of the first logical area (Logical Area 1) and a MOVE command MOVE CMD_H for changing the L2L mapping table L2L so as to access the first data DATA_1 through LPN1_b. The memory controller MC may detect the second L2L entry E1_b including LPN1_b by using the L2L mapping table L2L in response to the MOVE command MOVE CMD_H. The memory controller MC may change the second L2L entry E1_b to map LPN1_b to LPN2_a, which is the logical address LA2 of the second logical area (Logical Area 2) that is mapped to PPN_a, which is the physical address PA of the physical area (Physical Area) in which the first data DATA_1 is stored. In other words, the memory controller MC may change the logical address LA2 of the second logical area (Logical Area 2) of the second L2L entry E1_b, which includes LPN1_b, to LPN2_a. In an exemplary embodiment of the inventive concept, the memory controller MC may delete the second L2L entry E1_b, and then, may add an L2L entry representing a mapping relationship between LPN1_b and LPN2_a. Additionally, the memory controller MC may delete the first L2L entry E1_a from the L2L mapping table L2L.

In an exemplary embodiment of the inventive concept, along with the MOVE command MOVE CMD_H and LPN1_b (CLA_1), the memory controller MC may receive LPN1_a (CLA_2) which is the logical address LA1 of the first logical area (Logical Area 1) that was previously mapped to LPN2_a, from the host HOST. As described above, LPN2_a is the logical address LA2 of the second logical area (Logical Area 2) mapped to PPN_a, which is the physical address PA of the physical area (Physical Area) in which the first data DATA_1 is stored. The memory controller MC may detect the first L2L entry E1_a that includes LPN1_a with reference to the L2L mapping table L2L. The memory controller MC may change the logical address LA2 of the second L2L entry E1_b from LPN2_b to LPN2_a by referencing the detected first L2L entry E1_a.

The host HOST may recognize the first data DATA_1 as being stored in an area corresponding to LPN1_a of the first logical area (Logical Area 1). The memory controller MC may change the L2L mapping table L2L in response to the MOVE command MOVE CMD_H, and thus, the host HOST may recognize the first data DATA_1 as being stored in an area corresponding to LPN1_b of the first logical area (Logical Area 1). As described above, an undesirable data copy operation may be skipped based on the above-described operations of the memory controller MC.

Figure 7A:
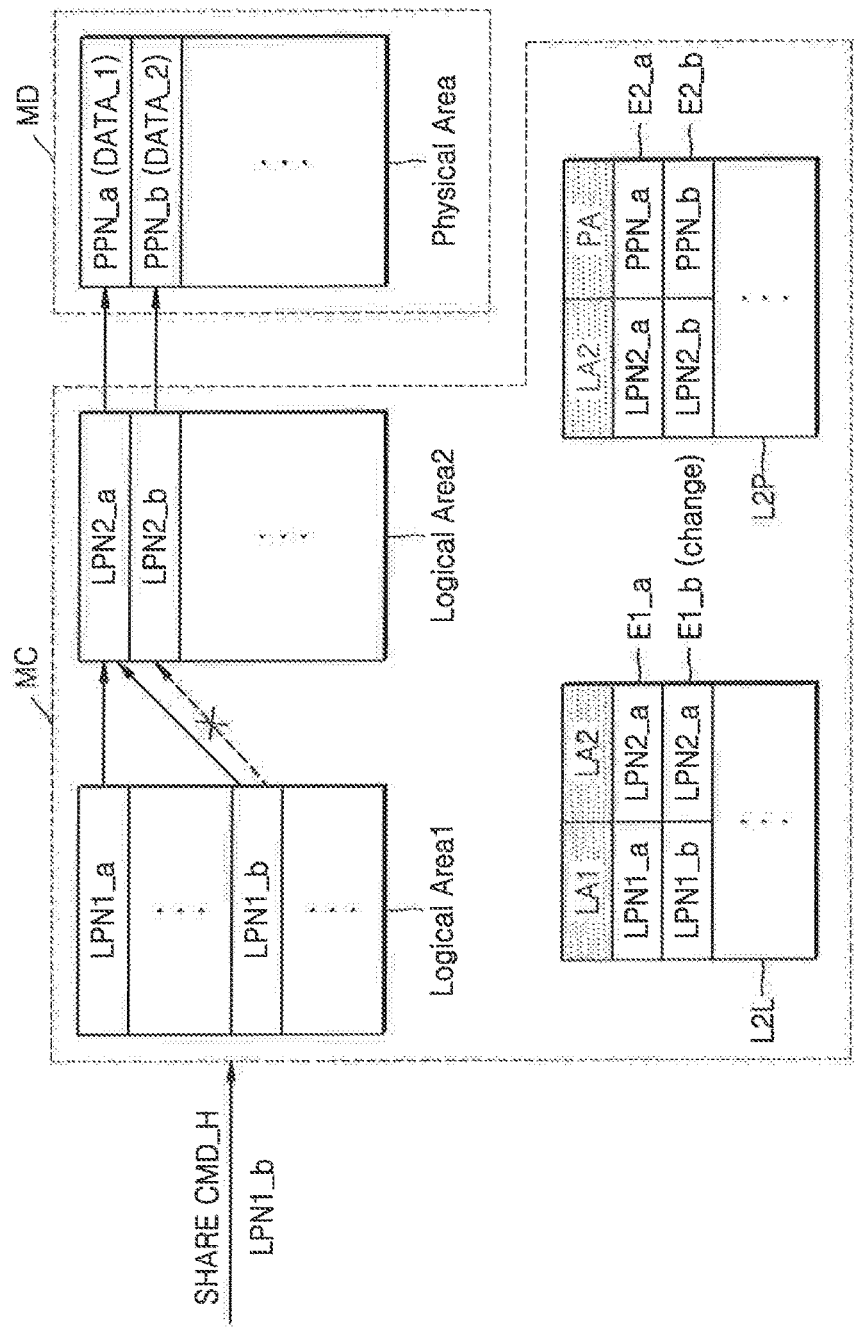
FIG. 7A is a diagram for describing an operation of a memory system based on a SHARE command according to an exemplary embodiment of the inventive concept.
Figure 7B:
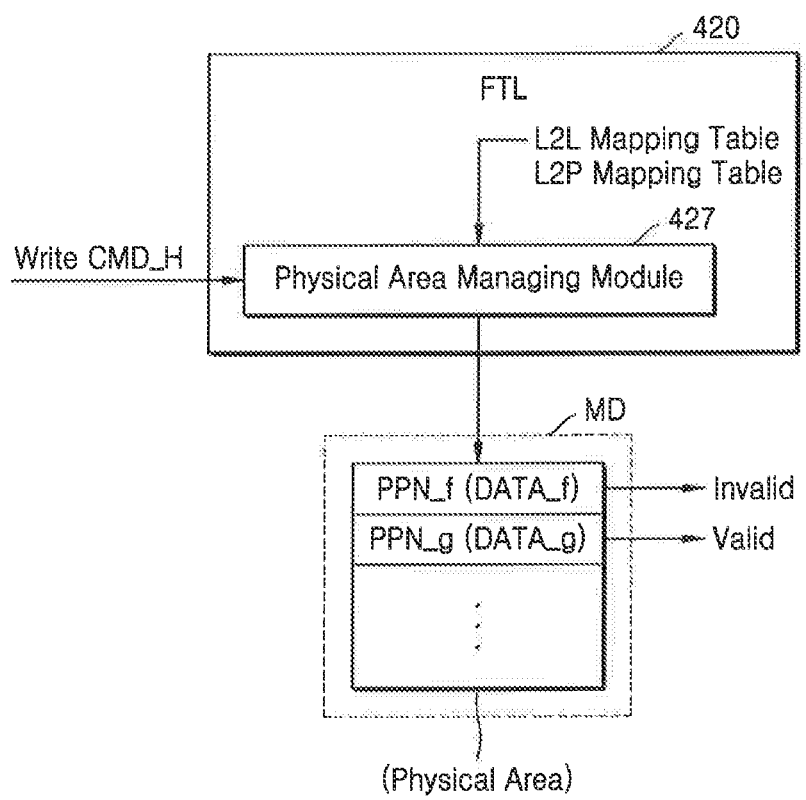
FIG. 7B is a block diagram illustrating a flash translation layer (FTL) based on the SHARE command of FIG. 7A according to an exemplary embodiment of the inventive concept.
Figure 7C:
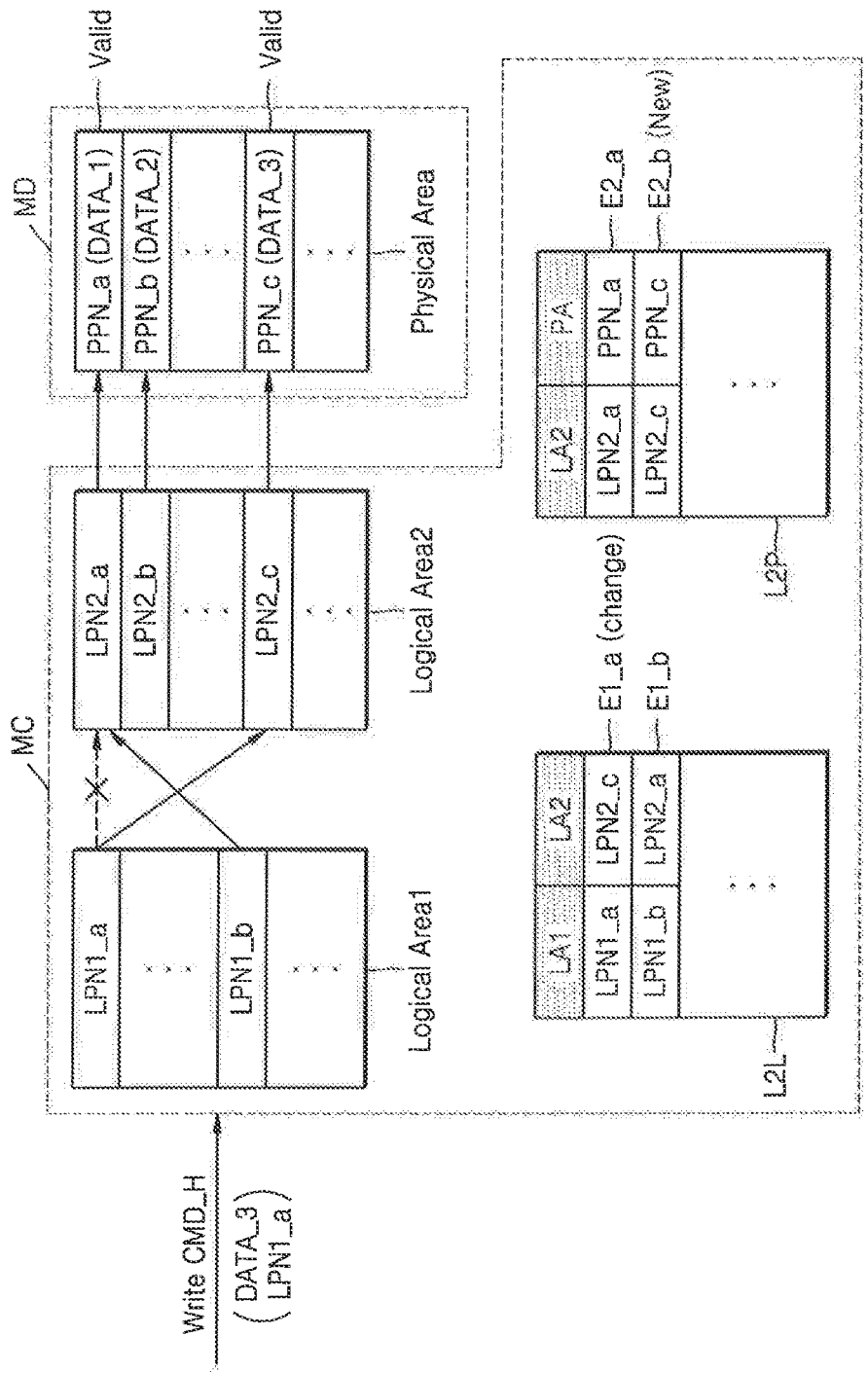
FIG. 7C is a diagram for describing a method of managing a physical area of the FTL of FIG. 7B according to an exemplary embodiment of the inventive concept.

FIG. 7A is a diagram for describing an operation of a memory system based on a SHARE command according to an exemplary embodiment of the inventive concept. FIG. 7B is a block diagram illustrating an FTL based on the SHARE command of FIG. 7A according to an exemplary embodiment of the inventive concept. FIG. 7C is a diagram for describing a method of managing a physical area of the FTL of FIG. 7B according to an exemplary embodiment of the inventive concept.

Referring to FIG. 7A, unlike FIG. 6, in response to a SHARE command SHARE CMD_H, the memory controller MC may change the second L2L entry E1_b by using LPN1_b of the first logical area (Logical Area 1) without deleting the first L2L entry E1_a. Therefore, LPN2_a may be mapped to LPN1_a and LPN1_b. In other words, LPN2_a of the second logic area (Logical Area 2) may be mapped to LPN1_a and LPN1_b of the first logical area (Logical Area 1). In this manner, one logical address LA2 of the second logical area (Logical Area 2) may be mapped to a plurality of logical addresses LA1 of the first logical area (Logical Area 1).

Referring to FIG. 7B, an FTL 420 included in the memory controller MC may further include a physical area managing module 427. The physical area managing module 427 may change valid data, stored in the physical area (Physical Area) of the memory device MD, to invalid data with reference to the L2L mapping table (L2L Mapping Table) and the L2P mapping table (L2P Mapping Table). In an exemplary embodiment of the inventive concept, when a write command or a trim command is received from the host HOST, the physical area managing module 427 may change certain valid data to invalid data. For example, the physical area managing module 427 may change data DATA_f, stored in a physical area corresponding to PPN_f, to invalid data, and may maintain data DATA_g, stored in a physical area corresponding to PPN_g, as valid data with reference to the L2L mapping table and the L2P mapping table.

Referring to FIG. 7C, as in FIG. 7A, when LPN1_a and LPN1_b are each mapped to LPN2_a according to the SHARE command, the memory controller MC may receive a write command (Write CMD_H), LPN1_a which is the logical address LA1 of the first logical area (Logical Area 1), and write data DATA_3 from the host HOST. The memory controller MC may detect the first L2L entry E1_a that includes LPN1_a. The memory controller MC may change the first L2L entry E1_a, for writing the write data DATA_3 in the memory device MD. For example, the memory controller MC may change the logical address LA2 of the first L2L entry E1_a from LPN2_a to LPN2_c. In an exemplary embodiment of the inventive concept, the memory controller MC may delete the first L2L entry E1_a, and then, may newly add an L2L entry representing a mapping relationship between LPN2_a and LPN2_c.

Moreover, the memory controller MC may write the write data DATA_3 in the memory device MD with reference to the L2P mapping table L2P. The memory controller MC may newly add the second L2P entry E2_b representing a mapping relationship between LPN2_c and PPN_c. The memory controller MC may write the write data DATA_3 in a physical area corresponding to PPN_c. Subsequently, the memory controller MC may determine whether to change the data DATA_1, stored in the physical area corresponding to PPN_a, to invalid data. The memory controller MC may recognize that LPN2_a, mapped to PPN_a, is still mapped to LPN1_b, based on the L2L mapping table L2L and the L2P mapping table L2P. Therefore, since the data DATA_1 may be later accessed by using LPN1_b, the memory controller MC may maintain the data DATA_1 as valid data.

Figure 8:
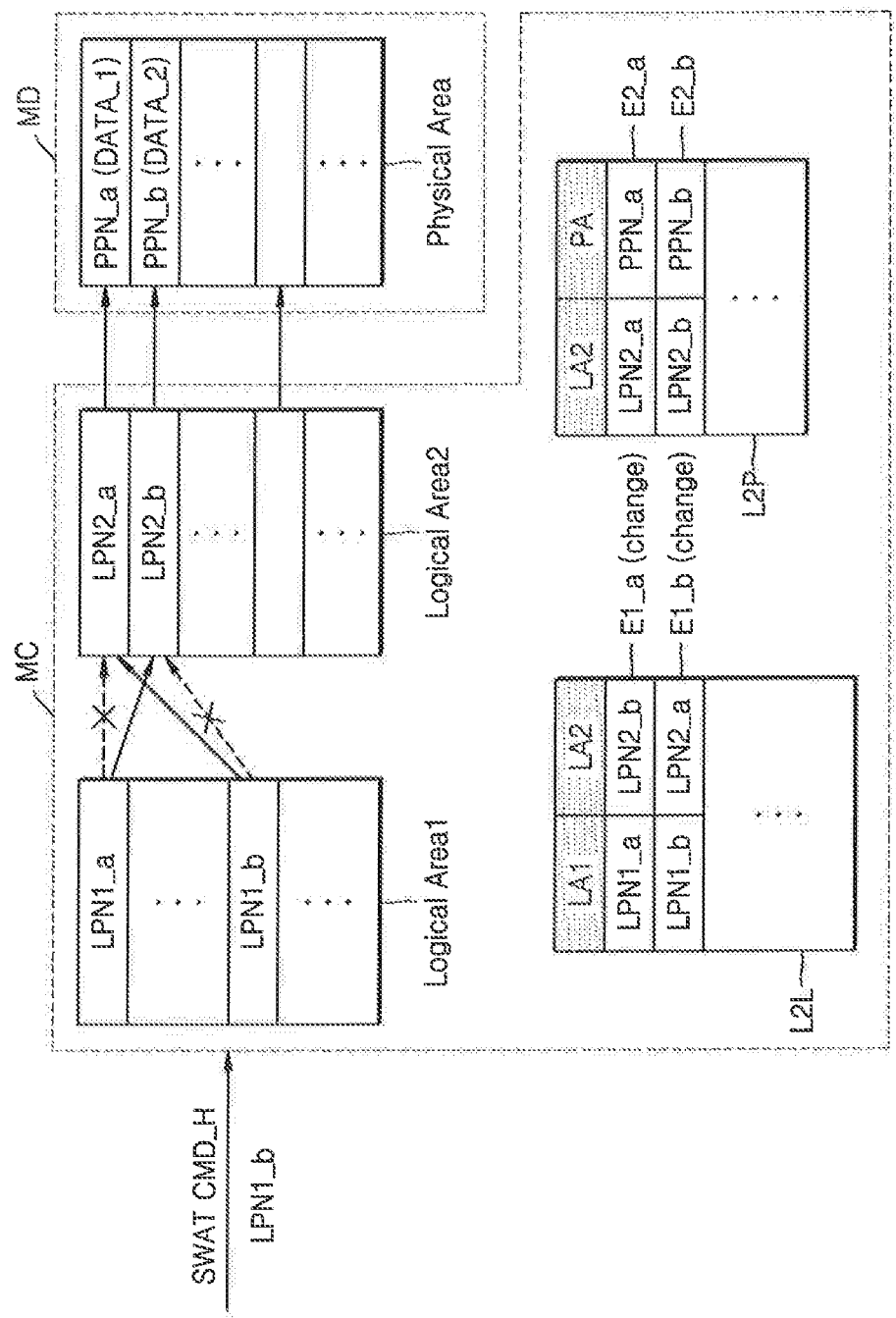
FIG. 8 is a block diagram illustrating an operation of a memory system based on a SWAT command according to an exemplary embodiment of the inventive concept.

FIG. 8 is a block diagram illustrating an operation of a memory system based on a SWAT command according to an exemplary embodiment of the inventive concept.

Referring to FIG. 8, unlike FIG. 6, the memory controller MC may change the first L2L entry E1_a and the second L2L entry E1_b by using LPN1_b in response to a SWAT (SWAP & TRIM) command SWAT CMD_H. For example, the memory controller MC may change LPN2_b, which is the logical address LA2 of the second L2L entry E1_b, to LPN2_a. Therefore, LPN1_a may be mapped to LPN2_b, and LPN1_b may be mapped to LPN2_a. In this manner, in response to the SWAT command SWAT CMD_H, the memory controller MC may execute control so that LPN1_a, which was previously mapped to LPN2_a, to be mapped to LPN2_b, which was previously mapped to LPN1_a According to an exemplary embodiment of the inventive concept, one logical address LA2 of the second logical area (Logical Area 2) may be mapped to one logical address LA1 of the first logical area (Logical Area 1) in a one-to-one correspondence relationship.

Figure 9:
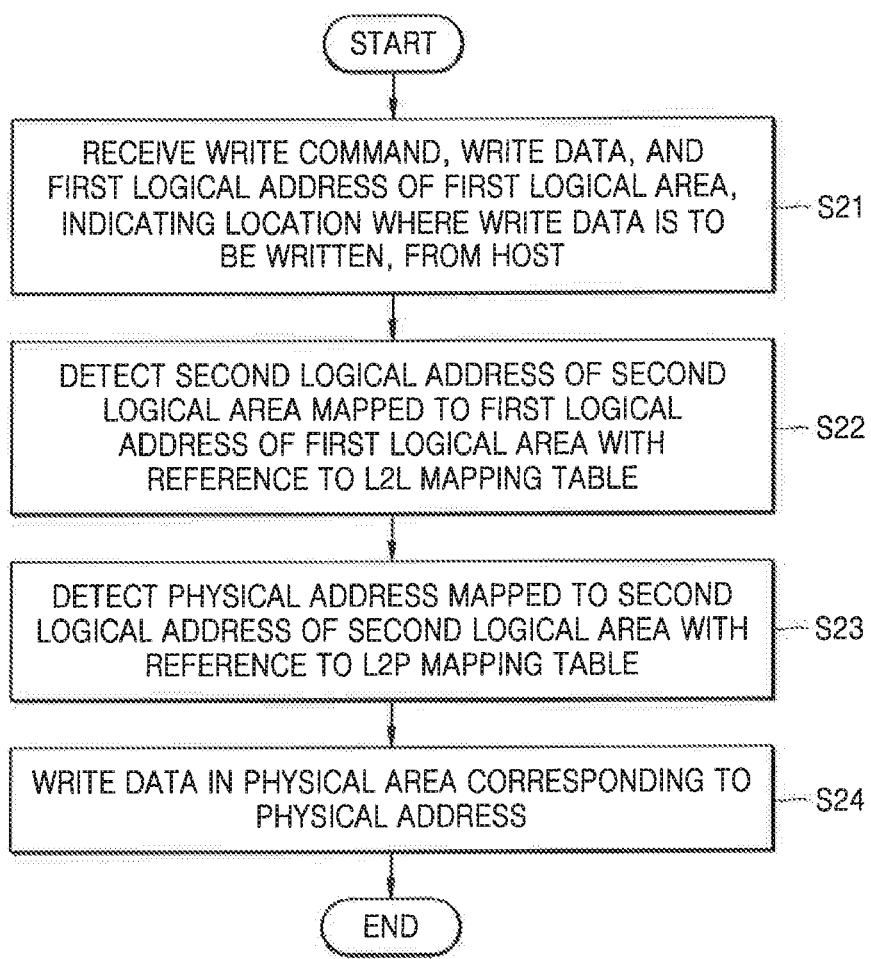
FIG. 9 is a flowchart for describing a write and read operation of a memory system according to an exemplary embodiment of the inventive concept.

FIG. 9 is a flowchart for describing a write and read operation of a memory system according to an exemplary embodiment of the inventive concept.

Referring to FIG. 9, in operation S21, a memory controller may receive a write command, write data, and a first logical address of a first logical area, indicating a location where the write data is to be written, from a host. In operation S22, the memory controller may detect a second logical address of a second logical area mapped to the first logical address of the first logical area with reference to the L2L mapping table. In an exemplary embodiment of the inventive concept, if an entry including the first logical address of the first logical area is not stored in the L2L mapping table, the memory controller may newly add an L2L entry indicating the second logical address of the second logical area mapped to the first logical address of the first logical area. In operation S23, The memory controller may change the first logical address of the first logical area to the second logical address of the second logical area by using the L2L mapping table, and may detect a physical address mapped to the second logical address of the second logical area with reference to an L2P mapping table. In an exemplary embodiment of the inventive concept, if an entry including the second logical address of the second logical area is not stored in the L2P mapping table, the memory controller may newly add an L2P entry indicating the physical address mapped to the second logical address of the second logical area. In operation S24, by using the L2P mapping table, the memory controller may change the second logical address to the physical address, and may write the write data in a physical area corresponding to the physical address.

Similar to operations S21-S24 described above, with respect to a read operation, the memory controller may receive a read command and the first logical address of the first logical area, indicating a location where read data is written, from the host. The memory controller may detect the second logical address of the second logical area mapped to the first logical address of the first logical area with reference to the L2L mapping table. The memory controller may change the first logical address to the second logical address by using the L2L mapping table, and may detect the physical address mapped to the second logical address with reference to the L2P mapping table. By using the L2P mapping table, the memory controller may change the second logical address to the physical address, and may read the read data from the physical area corresponding to the physical address.

Figure 10A:
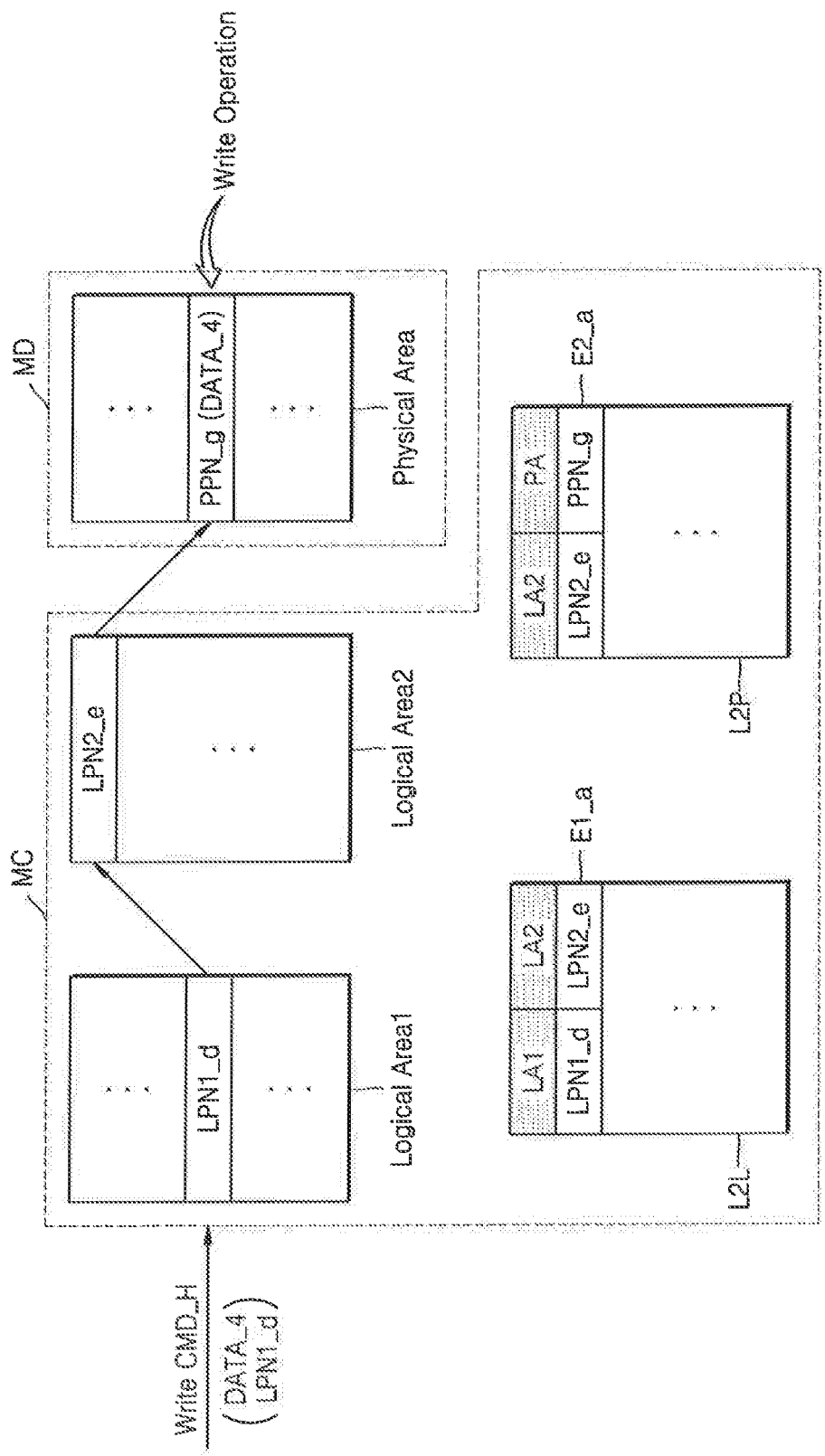
FIG. 10A is a diagram for describing a detailed operating method of a memory system when a write command is received from a host, according to an exemplary embodiment of the inventive concept.
Figure 10B:
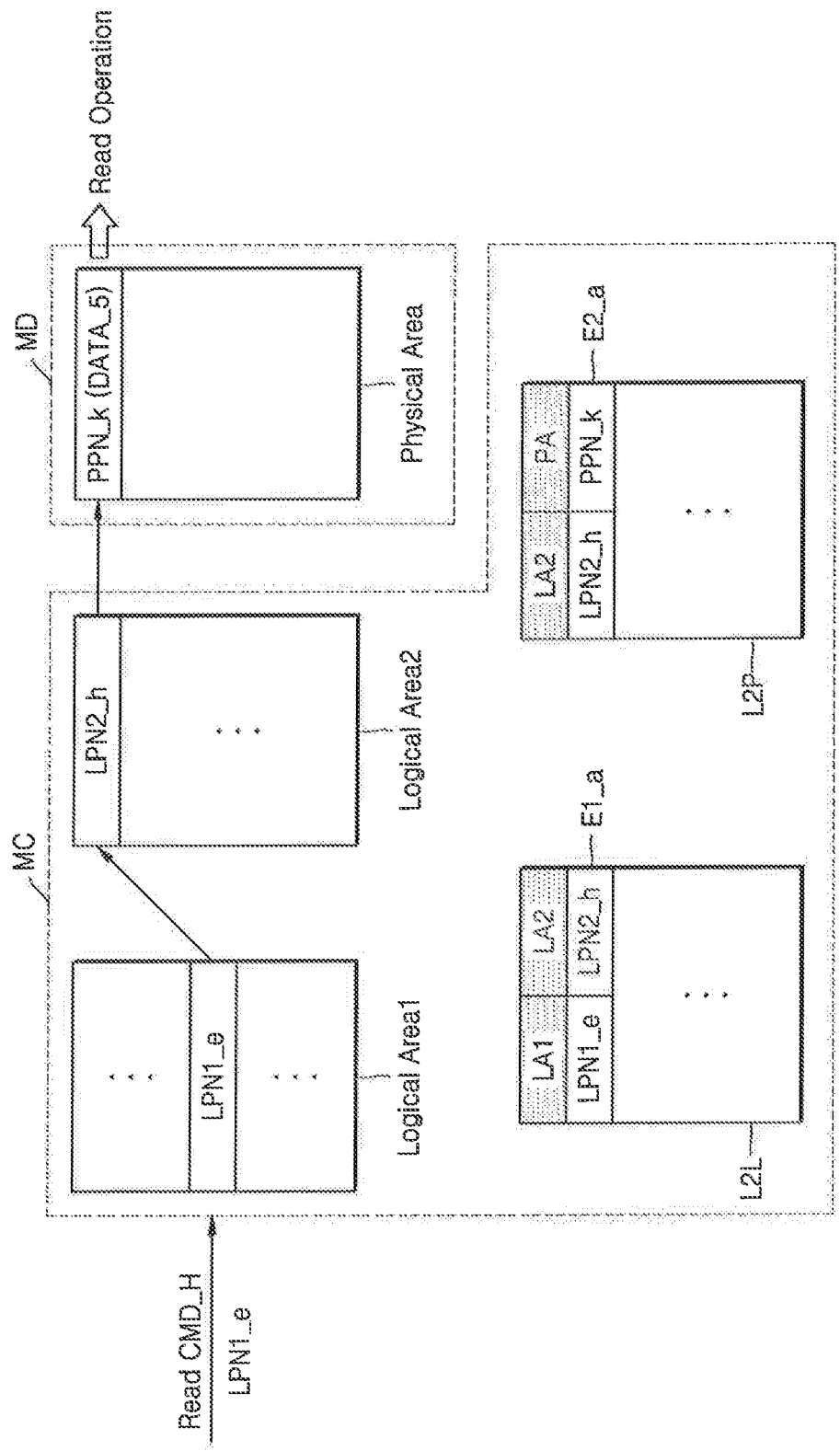
FIG. 10B is a diagram for describing a detailed operating method of a memory system when a read command is received from a host, according to an exemplary embodiment of the inventive concept.

FIG. 10A is a diagram for describing a detailed operating method of a memory system when a write command is received from a host, according to an exemplary embodiment of the inventive concept, and FIG. 10B is a diagram for describing a detailed operating method of a memory system when a read command is received from a host, according to an exemplary embodiment of the inventive concept.

Referring to FIG. 10A, the memory controller MC may receive, from the host HOST, a write command Write CMD_H, write data DATA_4, and LPN1_d, which is the logical address LA1 of the first logical area (Logical Area 1) that indicates a location where the write data DATA_4 is to be written. The memory controller MC may detect LPN2_e, which is the logical address LA2 of the second logic area (Logical Area 2) mapped to LPN1_d, based on the L2L mapping table L2L. The memory controller MC may change LPN1_d to LPN2_e by using the L2L mapping table L2L, and may detect PPN_g, which is the physical address PA mapped to LPN2_e, based on the L2P mapping table L2P. The memory controller MC may change LPN2_e to PPN_g, and may write the write data DATA_4 in a physical area corresponding to PPN_g.

Referring to FIG. 10B, the memory controller MC may receive, from the host HOST, a read command Read CMD_H and LPN1_e, which is the logical address LA1 of the first logical area (Logical Area 1) that indicates a location where the read data DATA_5 is written. The memory controller MC may detect LPN2_h, which is the logical address LA2 of the second logical area (Logical Area 2) mapped to LPN1_e, based on the L2L mapping table L2L. The memory controller MC may change LPN1_e to LPN2_h by using the L2L mapping table L2L, and may detect PPN_k, which is the physical address PA mapped to LPN2_h, based on the L2P mapping table L2P. The memory controller MC may change LPN2_h to PPN_k, and may read out read data DATA_5 from a physical area corresponding to PPN_k.

Figure 11:
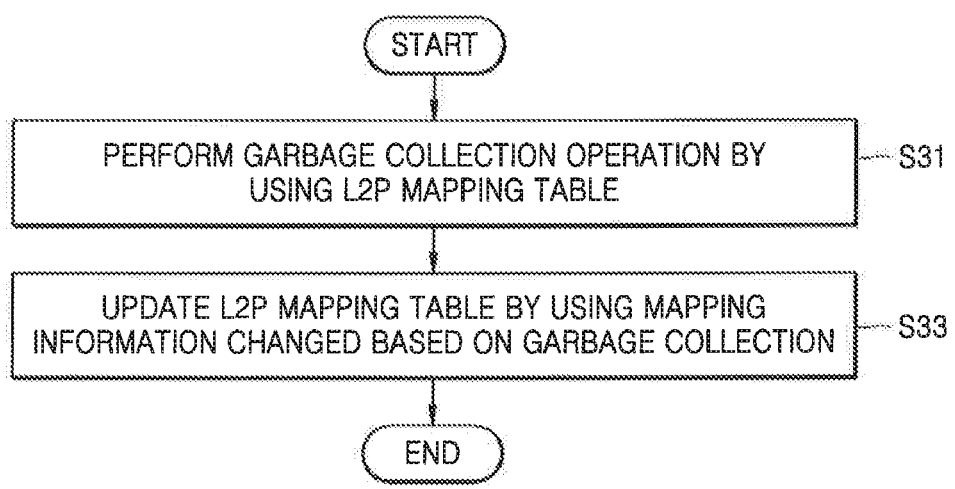
FIG. 11 is a flowchart for describing a garbage collection operation of a memory system according to an exemplary embodiment of the inventive concept.

FIG. 11 is a flowchart for describing a garbage collection operation of a memory system according to an exemplary embodiment of the inventive concept.

Referring to FIG. 11, a memory controller may determine a time when one or more free blocks are secured, and may enter a garbage collection mode based on a result of the determination. In operation S31, the memory controller may perform a garbage collection operation by using an L2P mapping table. In operation S33, the memory controller may change the L2P mapping table according to the garbage collection operation. Additionally, the memory controller may periodically or non-periodically store the changed L2P mapping table in a physical area of a memory device.

Figure 12A:
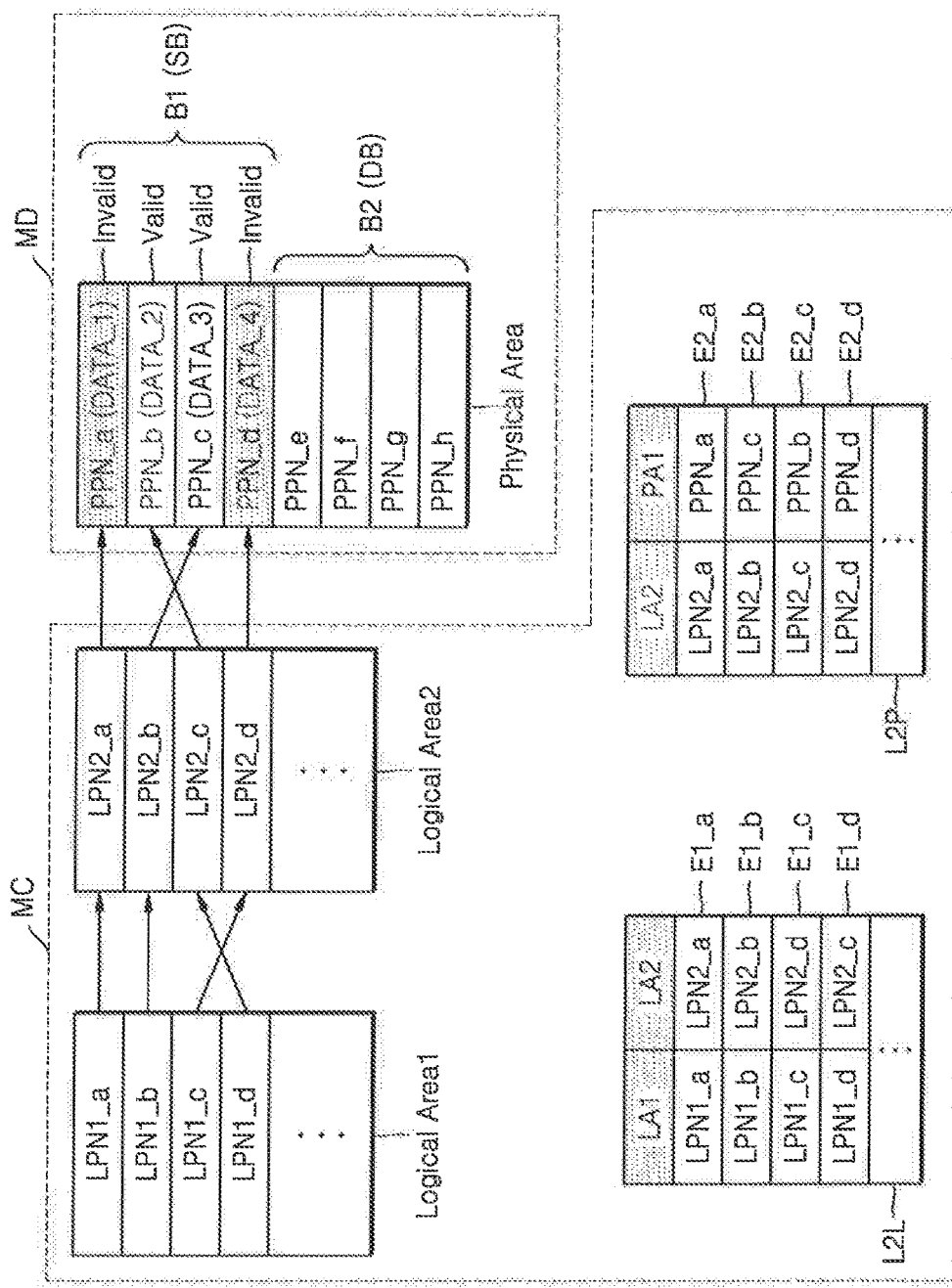
FIGS. 12A and 12B are block diagrams for describing a garbage collection operation of a memory system according to an exemplary embodiment of the inventive concept.
Figure 12B:
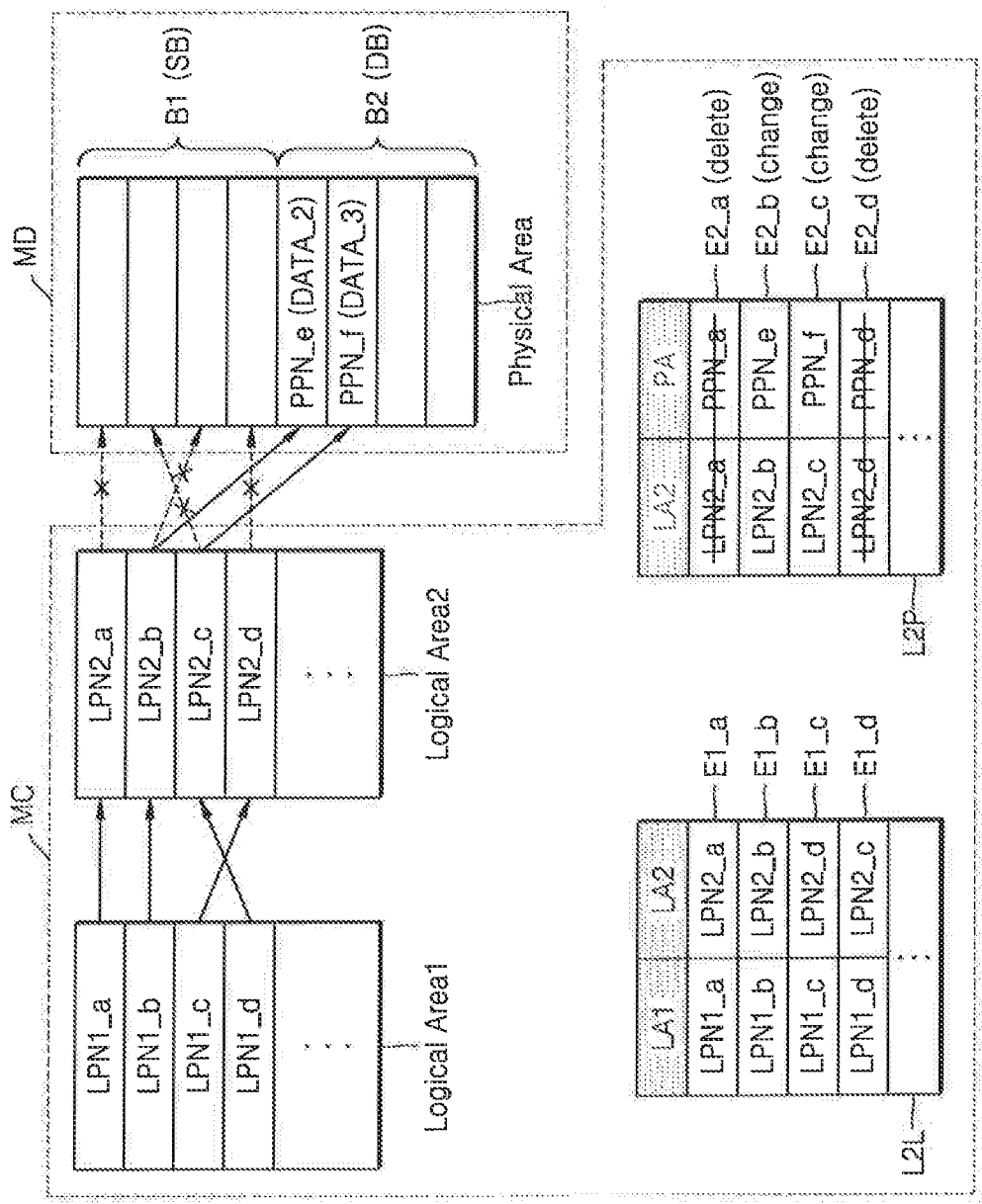

FIGS. 12A and 12B are block diagrams for describing a garbage collection operation of a memory system according to an exemplary embodiment of the inventive concept.

Referring to FIG. 12A, the memory controller MC may manage a physical area of the memory device MD by using the L2L mapping table L2L and the L2P mapping table L2P. The L2L mapping table L2L may include a plurality of L2L entries E1_a, E1_b, E1_c, E1_d, etc., and the L2P mapping table L2P may include a plurality of L2P entries E2_a, E2_b, E2_c, E2_d, etc.

Using the L2L mapping table L2L, LPN1_a, which is a logical address LA1 of the first logical area (Logical Area 1), may be mapped to LPN2_a, which is a logical address LA2 of the second logic area (Logical Area 2), LPN1_b of the first logical area (Logical Area 1) may be mapped to LPN2_b of the second logical area (Logical Area 2), LPN1_c of the first logical area (Logical Area 1) may be mapped to LPN2_d of the second logical area (Logical Area 2), and LPN1_d of the first logical area (Logical Area 1) may be mapped to LPN2_c of the second logical area (Logical Area 2). These mappings may correspond to first, second, third, and fourth L2L entries E1_a, E1_b, E1_c, and E1_d, respectively.

Using the L2P mapping table L2P, LPN2_a of the second logical area (Logical Area 2) may be mapped to PPN_a, LPN2_b of the second logical area (Logical Area 2) may be mapped to PPN_c, LPN2_c of the second logical area (Logical Area 2) may be mapped to PPN_b, and LPN2_d of the second logical area (Logical Area 2) may be mapped to PPN_d. PPN_a, PPN_c, PPN_b, PPN_d are physical addresses PA of the physical area (Physical Area). In this example, first data DATA_1 stored in a physical area corresponding to PPN_a and fourth data DATA_4 stored in a physical area corresponding to PPN_d may each be invalid data, and second data DATA_2 stored in a physical area corresponding to PPN_b and third data DATA_3 stored in a physical area corresponding to PPN_c may each be valid data.

When performing a garbage collection operation, the memory controller MC may determine a first block B1, in which the first to fourth data DATA_1 to DATA_4 are stored, as a source block SB, and may select a second block B2, corresponding to PPN_e to PPN_h, as a destination block DB.

Referring to FIG. 12B, the memory controller MC may perform the garbage collection operation by using the L2P mapping table L2P. The memory controller MC may erase the first to fourth data DATA_1 to DATA_4 stored in the source block SB, and may write the second data DATA_2 and the third data DATA_3, which are valid data, in the destination block DB. The memory controller MC may change the L2P mapping table L2P according to the garbage collection operation. For example, the memory controller MC may delete a first L2P entry E2_a and a fourth L2P entry E2_d of the L2P mapping table L2P, which correspond to invalid data, and may change a second L2P entry E2_b and a third L2P entry E2_c of the L2P mapping table L2P, which correspond to valid data. Additionally, when the memory controller MC is performing the garbage collection operation, the L2L mapping table L2L may be maintained (e.g., to be the same as illustrated in FIG. 12A).

Figure 13A:
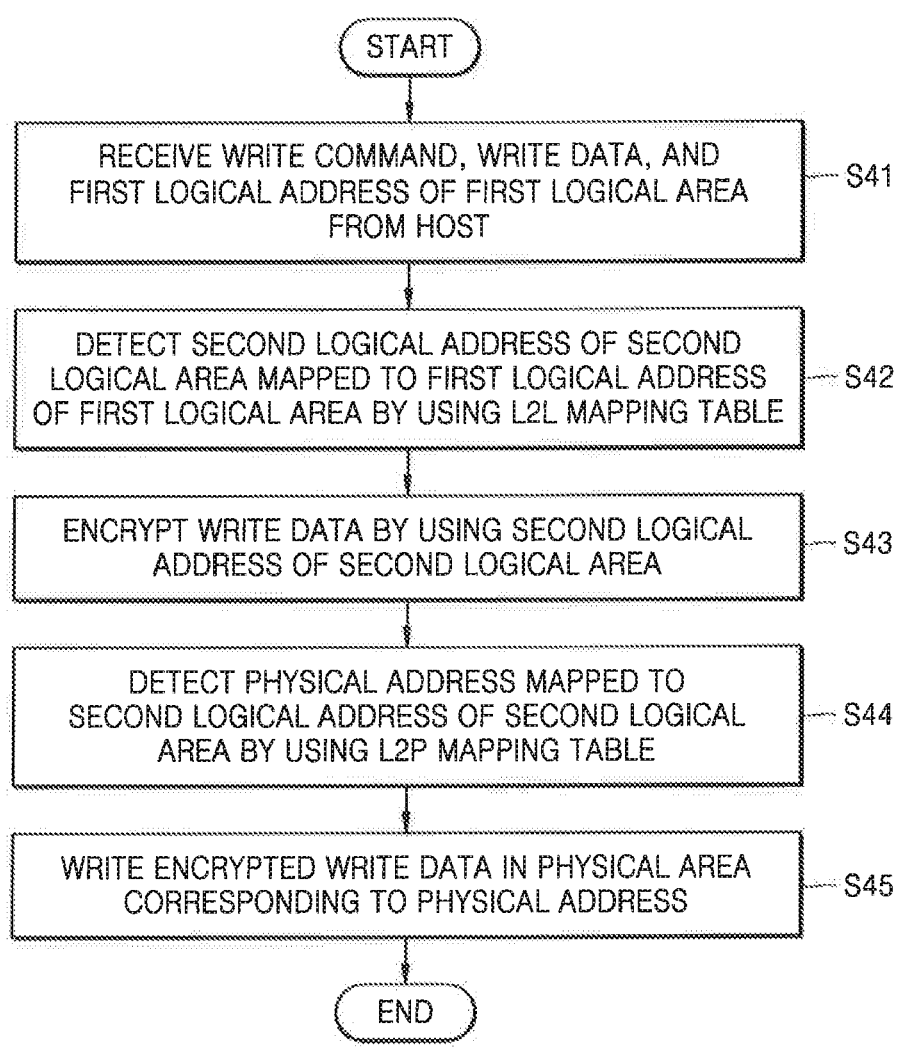
FIGS. 13A and 13B are block diagrams for describing a data encryption and decryption operation of a memory system according to an exemplary embodiment of the inventive concept.
Figure 13B:
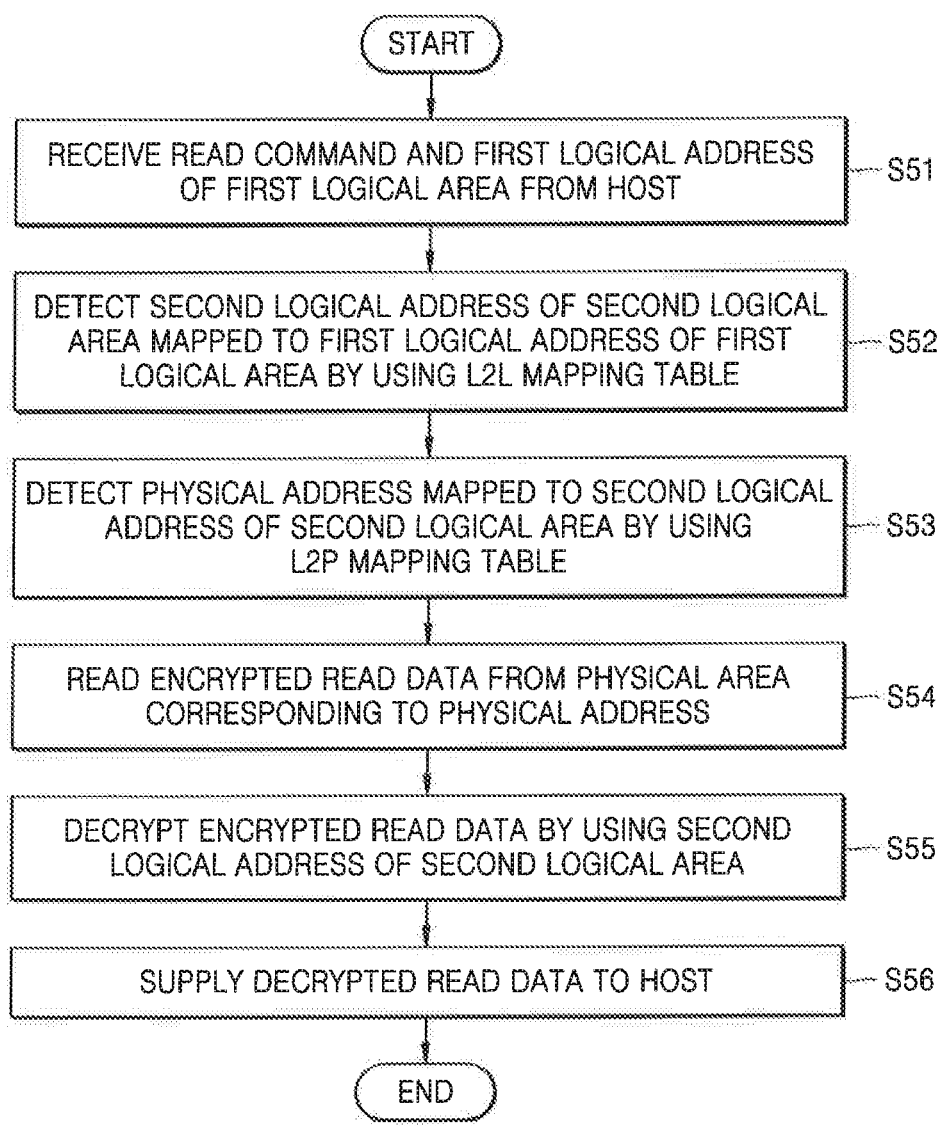

FIGS. 13A and 13B are block diagrams for describing a data encryption and decryption operation of a memory system according to an exemplary embodiment of the inventive concept.

Referring to FIG. 13A, in operation S41, a memory controller may receive a write command, write data, and a first logical address of a first logical area, indicating a location where the write data is to be written, from a host. In operation S42, the memory controller may detect a second logical address of the second logic area mapped to the first logical address of the first logical area with reference to an L2L mapping table. In operation S43, the memory controller may change the first logical address of the first logical area to the second logical address of the second logical area by using the L2L mapping table, and may perform an AES-based encryption operation on the write data by using the second logical address of the second logical area. In operation S44, the memory controller may detect a physical address mapped to the second logical address of the second logical area with reference to an L2P mapping table. In operation S45, by using the L2P mapping table, the memory controller may change the second logical address of the second logical area to the physical address, and may write encrypted write data in a physical area of a memory device corresponding to the physical address.

Referring to FIG. 13B, in operation S51, the memory controller may receive a read command and the first logical address of the first logical area, indicating a location where encrypted read data is written, from the host. In operation S52, the memory controller may detect the second logical address of the second logical area mapped to the first logical address of the first logical area with reference to the L2L mapping table. In operation S53, the memory controller may detect the physical address mapped to the second logical address of the second logical area by using the L2P mapping table. In operation S54, the memory controller may read encrypted read data from the physical area of the memory device corresponding to the physical address. In operation S55, the memory controller may decrypt the encrypted read data by using the second logical address of the second logical area. In operation S56, the memory controller may supply the decrypted read data to the host.

Figure 14A:
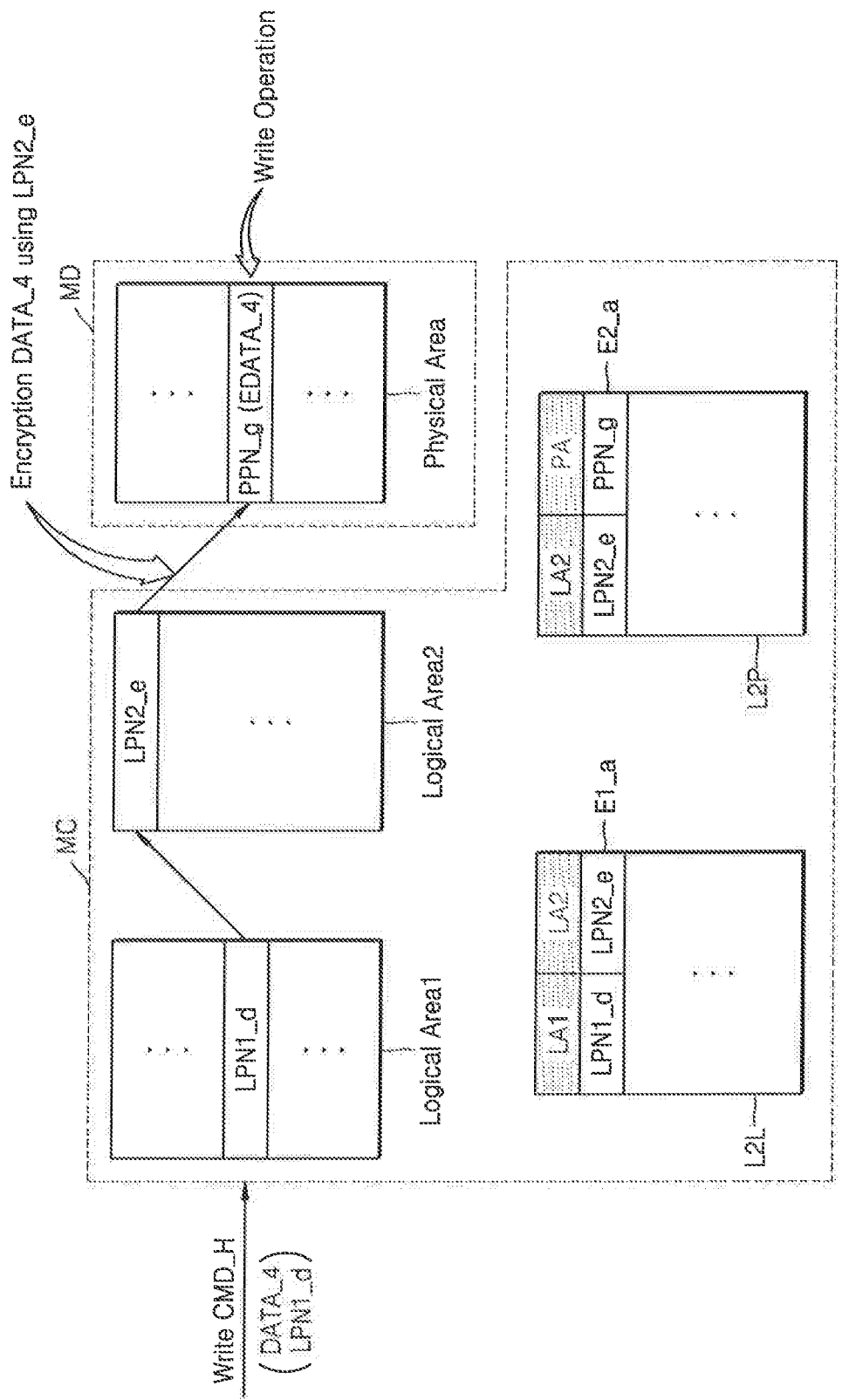
FIG. 14A is a diagram for describing a detailed operating method of a memory system encrypting write data, according to an exemplary embodiment of the inventive concept.
Figure 14B:
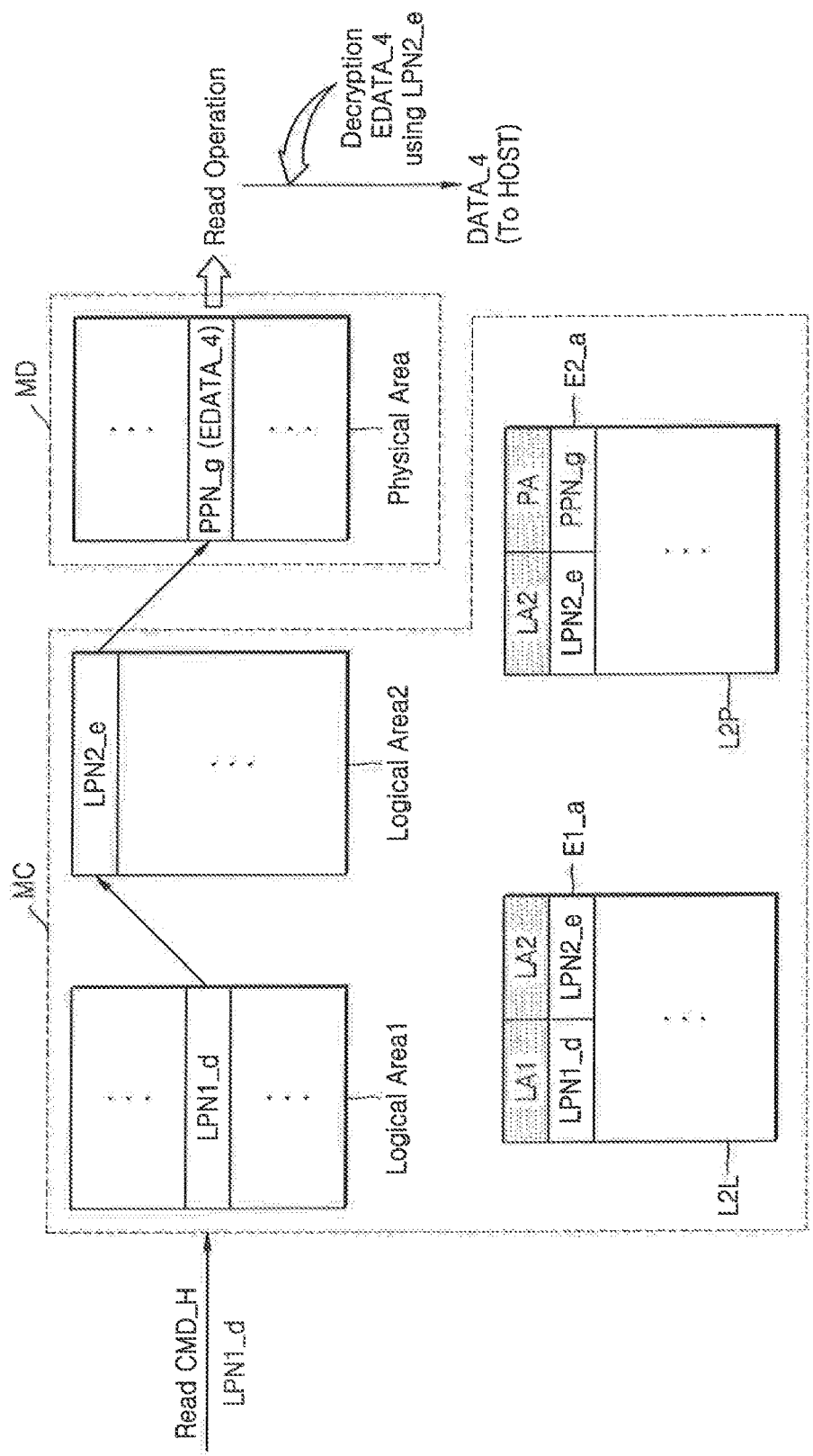
FIG. 14B is a diagram for describing a detailed operating method of a memory system decrypting read data, according to an exemplary embodiment of the inventive concept.

FIG. 14A is a diagram for describing a detailed operating method of a memory system encrypting write data, according to an exemplary embodiment of the inventive concept, and FIG. 14B is a diagram for describing a detailed operating method of a memory system decrypting read data, according to an exemplary embodiment of the inventive concept.

Referring to FIG. 14A, the memory controller MC may receive, from the host HOST, the write command Write CMD_H, write data DATA_4, and LPN1_d, which is the logical address LA1 of the first logical area (Logical Area 1) that indicates a location where the write data DATA_4 is to be written. The memory controller MC may detect LPN2_e, which is the logical address LA2 of the second logic area (Logical Area 2) mapped to LPN1_d, based on the L2L mapping table L2L. The memory controller MC may change LPN1_d to LPN2_e by using the L2L mapping table L2L, and may detect PPN_g, which is the physical address PA mapped to LPN2_e, based on the L2P mapping table L2P. The memory controller MC may encrypt the write data DATA_4 by using LPN2_e of the second logical area (Logical Area 2). The memory controller MC may change LPN2_e to PPN_g, and may write the encrypted write data DATA_4 in a physical area corresponding to PPN_g in the physical area (Physical Area).

Referring to FIG. 14B, the memory controller MC may receive, from the host HOST, the read command Read CMD_H and LPN1_d, which is the logical address LA1 of the first logical area (Logical Area 1) that indicates a location where read data DATA_4 is stored. The memory controller MC may detect LPN2_e, which is the logical address LA2 of the second logical area (Logical Area 2) mapped to LPN1_d, based on the L2L mapping table L2L. The memory controller MC may change LPN1_d to LPN2_e by using the L2L mapping table L2L, and may detect PPN_g, which is the physical address PA mapped to LPN2_e, based on the L2P mapping table L2P. The memory controller MC may change LPN2_e to PPN_g, and may read encrypted read data EDATA_4 from a physical area corresponding to the PPN_g in the physical area (Physical Area). The memory controller MC may decrypt the encrypted read data EDATA_4 by using LPN2_e, and may supply the decrypted read data DATA_4 to the host HOST.

Figure 15:
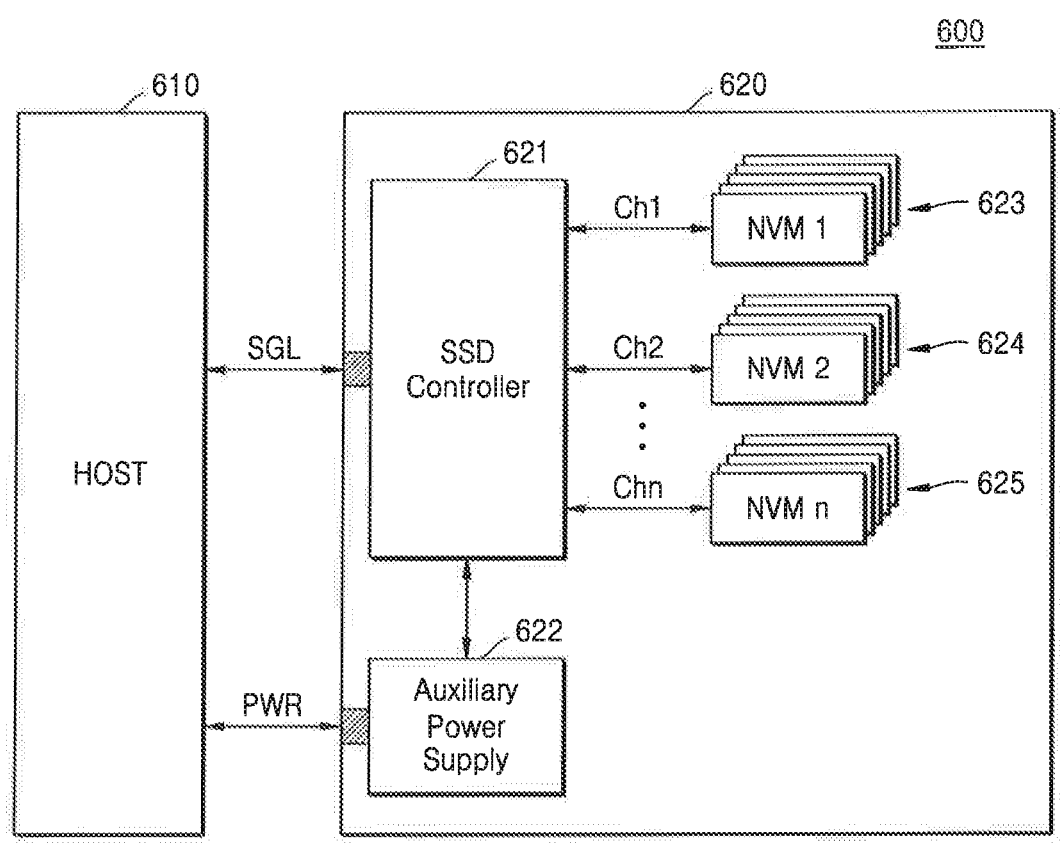
FIG. 15 is a block diagram illustrating a memory device according to exemplary embodiments of the inventive concept applied to a solid state disk (SSD) system.

FIG. 15 is a block diagram illustrating a memory device according to exemplary embodiments of the inventive concept applied to a solid state disk (SSD) system.

Referring to FIG. 15, a SSD system 600 may include a host 610 and an SSD 620. The SSD 620 may transmit or receive a signal to or from the host 610 through a signal connector SGL and may be supplied with power through a power connector PWR. The SSD 620 may include an SSD controller 621, an auxiliary power supply 622, and a plurality of nonvolatile memory systems 623, 624, and 625. The plurality of nonvolatile memory systems 623, 624, and 625 may each include the memory device according to exemplary embodiments of the inventive concept, as described above. According to an exemplary embodiment of the inventive concept, each of the plurality of nonvolatile memory systems 623, 624, and 625 may perform a memory operation by using the L2L mapping table and the L2P mapping table according to the above-described exemplary embodiments, and particularly, may skip an undesirable data copy operation through a data processing operation based on the L2L mapping table.

While the inventive concept has been shown and described with reference to exemplary embodiments thereof, it will be understood by those of ordinary skill in the art that various changes in form and details may be made thereto without materially departing from the spirit and scope of the inventive concept as defined by the following claims.

What is claimed is:

1. An operating method of a memory controller, including a logical-to-logical (L2L) mapping table including mapping information between a first logical area and a second logical area and a logical-to-physical (L2P) mapping table including mapping information between the second logical area and a physical area of a memory device, the operating method comprising:
receiving a first logical address of the first logical area and a first command for changing the L2L mapping table to access first data stored in the memory device through the first logical address of the first logical area;
detecting a second logical address of the second logical area mapped to a physical address of the physical area in which the first data is stored, in response to the first command; and
changing the L2L mapping table to map the first logical address of the first logical area to the second logical address of the second logical area.

2. The operating method of claim 1, further comprising:
receiving a second command for processing second data; and
processing the second data by using the L2L mapping table and the L2P mapping table in response to the second command.

3. The operating method of claim 2, wherein the second command is a write command or a read command corresponding to the second data.

4. The operating method of claim 2, wherein processing the second data comprises encrypting or decrypting the second data by using a third logical address of the second logical area.

5. The operating method of claim 1, wherein the first command is one of a MOVE command, a SHARE command, or a SWAT command.

6. The operating method of claim 1, wherein receiving the first logical address of the first logical area and the first command comprises receiving a third logical address of the first logical area, which is previously mapped to the second logical address of the second logical area.

7. The operating method of claim 6, wherein detecting the second logical address of the second logical area comprises detecting the second logical address of the second logical area that is mapped to the third logical address of the first logical area, based on the L2L mapping table.

8. The operating method of claim 1, further comprising: performing a garbage collection operation by using the L2P mapping table.

9. The operating method of claim 8, further comprising:
changing the L2P mapping table according to the garbage collection operation and maintaining the L2L mapping table.

10. The operating method of claim 1, wherein the first logical address of the first logical area is mapped to the second logical address of the second logical area in a one-to-one relationship.

11. The operating method of claim 1, wherein in changing the L2L mapping table, a plurality of logical addresses of the first logical area, including the first logical address of the first logical area, is mapped to the second logical address of the second logical area.

12. An operating method of a memory system, which includes a memory controller including a first logical area and a second logical area and a memory device including a physical area, the operating method comprising:
receiving a first logical address of the first logical area and a first command for enabling data stored in the memory device to be accessed through the first logical address of the first logical area; and
mapping a second logical address of the second logical area to the first logical address of the first logical area in response to the first command; and
changing a mapping relationship between the second logical address of the second logical area and a third logical address of the first logical area that is previously mapped to the second logical address of the second logical area;
wherein the second logical address of the second logical area is mapped to a physical address of the physical area in which the data is stored, and
wherein changing the mapping relationship comprises mapping a fourth logical address of the second logical area, previously mapped to the first logical address of the first logical area, to the third logical address of the first logical area.

13. The operating method of claim 12, further comprising:
receiving the first logical address of the first logical area and a second command for accessing the data;
accessing the second logical address of the second logical area mapped to the first logical address of the first logical area; and
accessing the data by accessing the physical address of the physical area mapped to the second logical address of the second logical area.

14. An operating method of a memory controller, including a logical-to-logical (L2L) mapping table including mapping information between a first logical area and a second logical area and a logical-to-physical (L2P) mapping table including mapping information between the second logical area and a physical area of a memory device, the operating method comprising:
receiving a first logical address of the first logical area and a command;
determining a first L2L entry in the L2L mapping table using the first logical address of the first logical area, wherein the first L2L entry includes a second logical address of the second logical area;
determining a first L2P entry in the L2P mapping table using the second logical address of the second logical area, wherein the first L2P entry includes a physical address of the physical area; and
updating the L2L mapping table or the L2P mapping table in response to the command,
wherein updating the L2L mapping table or the L2P mapping table comprises:
changing the first L2L entry in the L2L mapping table to map the first logical address of the first logical area to a third logical address of the second logical area.

15. The operating method of claim 14, wherein updating the L2L mapping table or the L2P mapping table further comprises:
deleting a second L2L entry in the L2L mapping table that includes the third logical address of the second logical area.

16. The operating method of claim 14, wherein updating the L2L mapping table or the L2P mapping table further comprises:
changing a second L2L entry in the L2L mapping table to map a fourth logical address of the first logical area to the second logical address of the second logical area.

17. The operating method of claim 14, further comprising:
determining that the physical address corresponds to invalid data,
wherein updating the L2L mapping table or the L2P mapping table comprises:
deleting the first L2P entry in the L2P mapping table.

\* \* \* \* \*